US010585710B2

(12) United States Patent
Smith et al.

(10) Patent No.: US 10,585,710 B2
(45) Date of Patent: Mar. 10, 2020

(54) DYNAMIC CODE COMPONENT DEPLOYMENT IN CLOUD-BASED SERVICE PLATFORMS

(71) Applicant: Box, Inc., Los Altos, CA (US)

(72) Inventors: Benjamin Campbell Smith, Mountain View, CA (US); Gaurav Gargate, Newark, CA (US); Bonan Zheng, Sunnyvale, CA (US); Timothy Martin Heilig, Palo Alto, CA (US)

(73) Assignee: Box, Inc., Redwood City, CA (US)

( * ) Notice: Subject to any disclaimer, the term of this patent is extended or adjusted under 35 U.S.C. 154(b) by 248 days.

(21) Appl. No.: 14/986,342

(22) Filed: Dec. 31, 2015

(65) Prior Publication Data

US 2017/0192765 A1 Jul. 6, 2017

(51) Int. Cl.
*G06F 9/44* (2018.01)
*G06F 9/50* (2006.01)
(Continued)

(52) U.S. Cl.
CPC .............. *G06F 9/505* (2013.01); *G06F 8/36* (2013.01); *G06F 9/45558* (2013.01); *G06F 9/54* (2013.01);
(Continued)

(58) Field of Classification Search
CPC . H04L 67/10; H04L 67/1002; H04L 67/1003; H04L 67/1008; H04L 67/1025; H04L 67/1029; H04L 67/1097; G06F 9/455; G06F 9/54; G06F 9/547; G06F 9/548; G06F 9/50; G06F 9/5005; G06F 9/5027; G06F 9/505; G06F 9/5083;
(Continued)

(56) References Cited

U.S. PATENT DOCUMENTS 5,459,837 A * 10/1995 Caccavale ............. G06F 9/5055
702/182
6,813,637 B2 * 11/2004 Cable ...................... H04L 29/06
709/201
(Continued)

FOREIGN PATENT DOCUMENTS

EP 2667303 A2 11/2013

*Primary Examiner* — Qamrun Nahar
(74) *Attorney, Agent, or Firm* — Vista IP Law Group, LLP

(57) ABSTRACT

Methods and systems for managing application performance in a distributed computing environment. Embodiments commence when an application seeks to perform a function over a content object. The application submits a request to perform the function on the content object, and the request is received by an application programming interface processor. The application programming interface processor accesses a data structure comprising entries that relate the requested function to one or more code instances that are accessible at one or more code locations. An evaluator predicts performance of the function using a first location of a first code instance and compares that predicted performance to a predicted or measured performance of the same function using a second location of a second code instance that implements the same function. The better performing code instance at the determined code location is invoked. Results are collated, formatted, and returned to the calling application.

20 Claims, 16 Drawing Sheets

(51) Int. Cl.
*G06F 9/455* (2018.01)
*G06F 8/36* (2018.01)
*H04L 29/08* (2006.01)
*G06F 9/54* (2006.01)

(52) U.S. Cl.
CPC .... *G06F 2009/45575* (2013.01); *H04L 67/10* (2013.01)

(58) Field of Classification Search
CPC .. G06F 11/34; G06F 11/3404; G06F 11/3409; G06F 11/3433
See application file for complete search history.

(56) References Cited

U.S. PATENT DOCUMENTS

| | | | | |
|---|---|---|---|---|
| 7,127,713 | B2 * | 10/2006 | Davis | H04L 67/1002 717/177 |
| 7,155,380 | B2 * | 12/2006 | Hunt | H04L 67/1002 709/226 |
| 7,386,616 | B1 * | 6/2008 | Henzinger | G06F 9/505 709/226 |
| 8,914,900 | B2 | 12/2014 | Smith | |
| 9,197,720 | B2 * | 11/2015 | Fernandez-Ruiz | H04L 67/42 |
| 9,372,733 | B2 * | 6/2016 | Copsey | G06F 9/505 |
| 9,953,036 | B2 | 4/2018 | MacKenzie | |
| 9,998,446 | B2 | 6/2018 | Branden | |
| 2003/0154239 | A1 * | 8/2003 | Davis | H04L 67/1002 709/201 |
| 2003/0187946 | A1 * | 10/2003 | Cable | H04L 29/06 709/215 |
| 2005/0102538 | A1 * | 5/2005 | Hunt | H04L 67/1002 726/4 |
| 2013/0151594 | A1 * | 6/2013 | Fernandez-Ruiz | H04L 67/42 709/203 |
| 2013/0297680 | A1 | 11/2013 | Smith | |
| 2014/0201344 | A1 * | 7/2014 | Copsey | G06F 9/505 709/223 |
| 2014/0337291 | A1 | 11/2014 | Dorman | |
| 2014/0372376 | A1 | 12/2014 | Smith | |
| 2014/0379647 | A1 | 12/2014 | Smith | |
| 2015/0006630 | A1 * | 1/2015 | Thomas | H04L 67/1008 709/203 |
| 2015/0180963 | A1 * | 6/2015 | Luecke | H04L 67/1097 709/203 |
| 2015/0339113 | A1 | 11/2015 | Dorman | |
| 2016/0359684 | A1 * | 12/2016 | Rizqi | G06F 9/44505 |
| 2017/0192765 | A1 * | 7/2017 | Smith | G06F 8/61 |

* cited by examiner

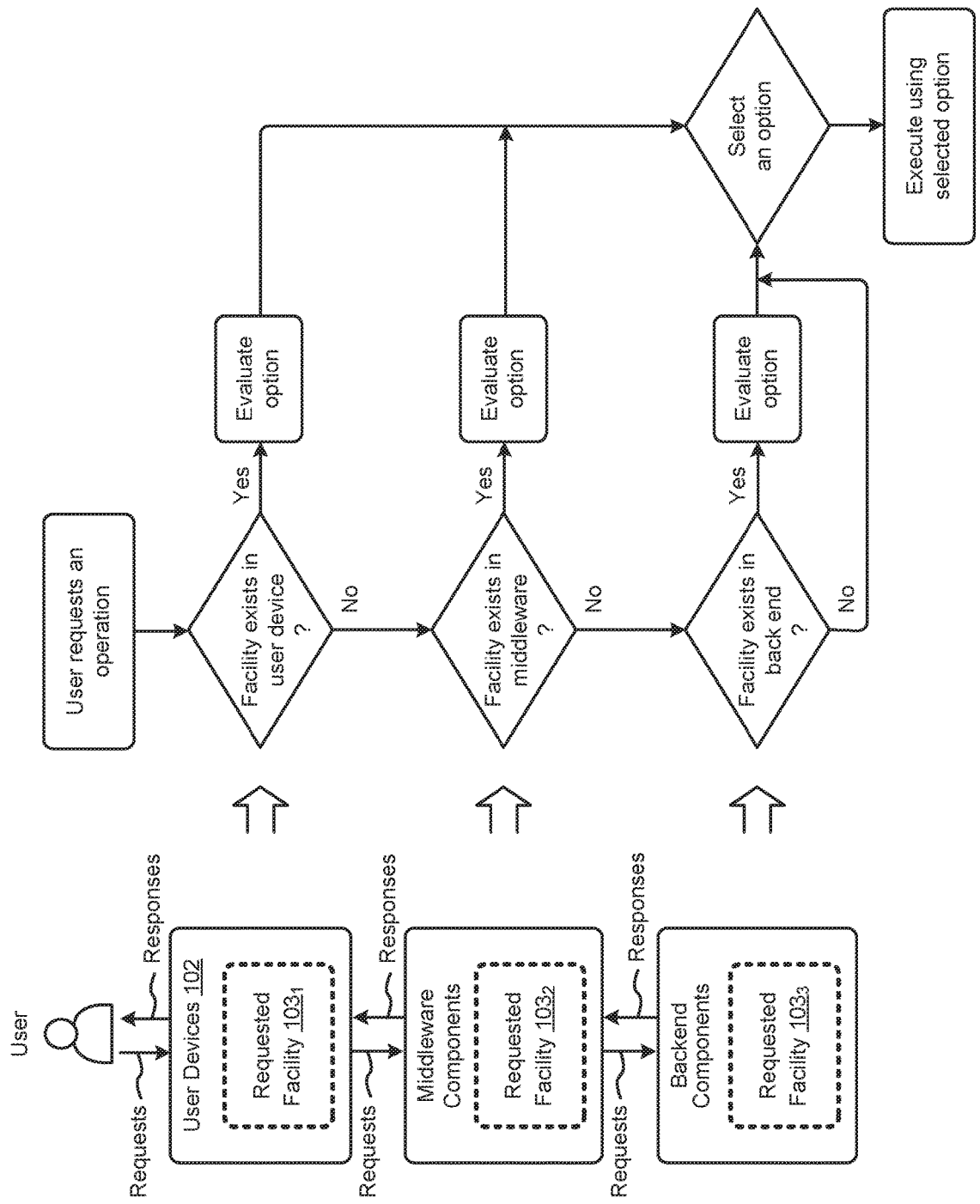
FIG. 1A1

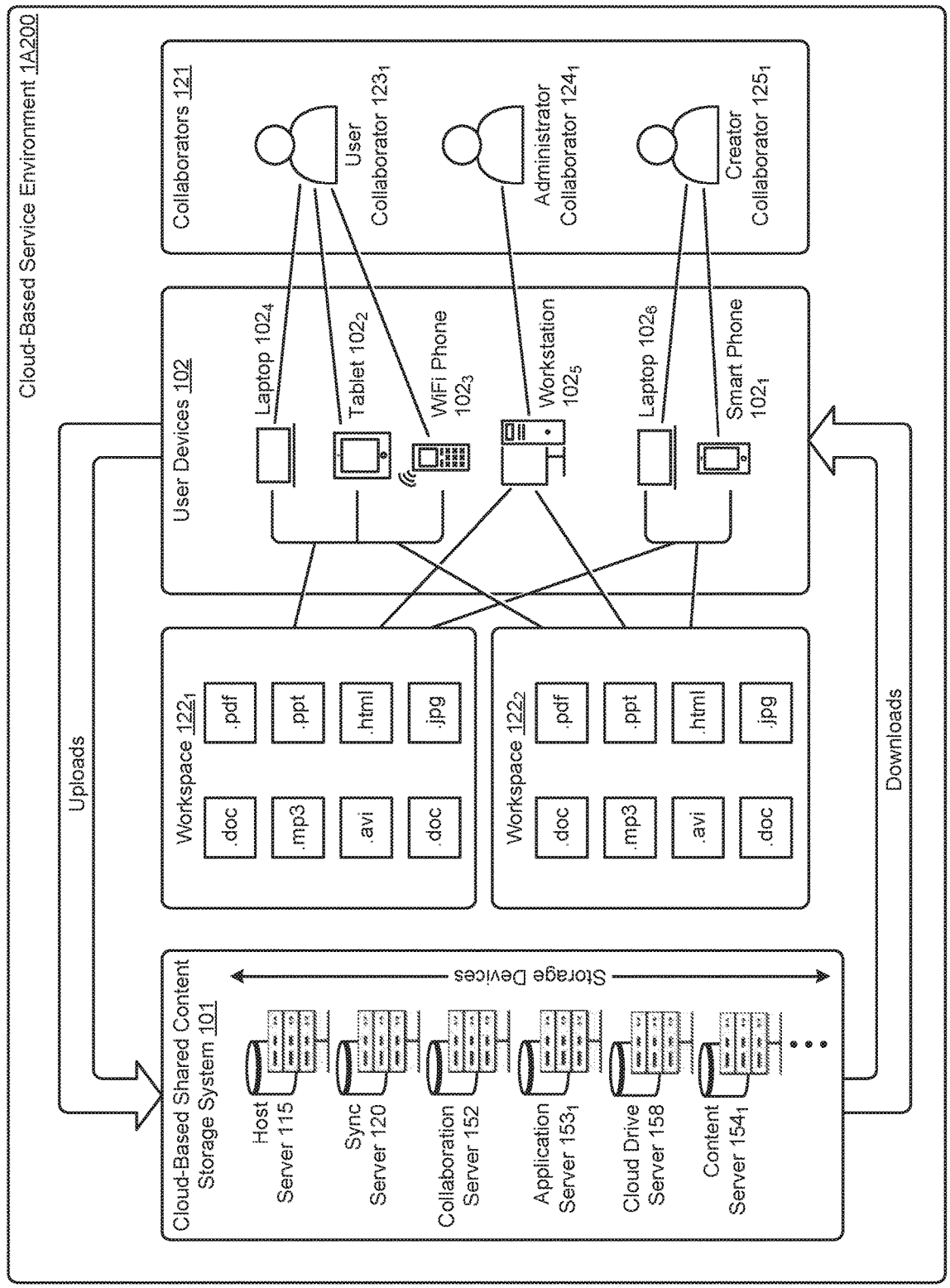
FIG. 1A2

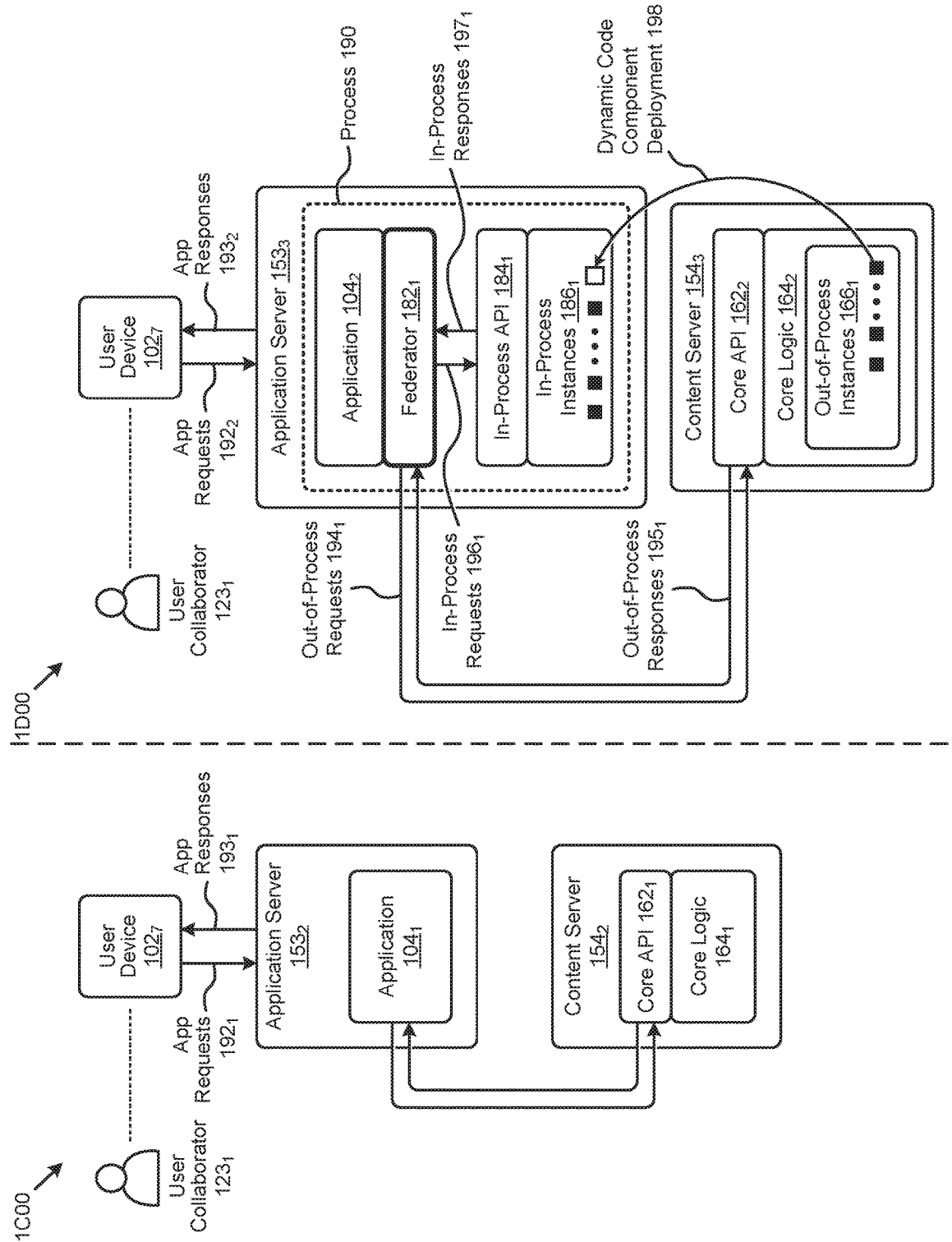

DYNAMIC CODE COMPONENT DEPLOYMENT IN CLOUD-BASED SERVICE PLATFORMS

FIELD

This disclosure relates to managing the provisioning and performance of applications in a distributed computing environment, and more particularly to techniques for dynamic code component deployment in cloud-based service platforms.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Web-based content application services (e.g., web services) and platforms (e.g., cloud computing platforms) have become ubiquitous. One benefit of using such application services and platforms is the ability to securely share content among trusted collaborators on a variety of user devices such as mobile phones, tablets, laptop computers, desktop computers, and/or other devices from any geographic location. To facilitate such flexible "always on" access, certain cloud-based shared content management platforms might provide various user applications in a distributed computing environment. For example, one or more applications might be provided to enable users to manage content, permissions, collaborators, and more. In many of these cases, a decision needs to be made as to where (e.g., which application server in which physical location) the code components that deliver the application functionality should be situated for execution. For example, some code components might be deployed as "in-process" code components to run in the same process (e.g., thread) as the application core logic, while other code components might be deployed as "out-of-process" code components to run in their own process separate from the application process (e.g., in middleware or in a back-end, etc.). In some cases, in-process code components can provide faster response times than that of out-of-process code components, however such an implementation might require that multiple instances of the in-process code components be maintained across multiple application servers. In other cases, the nature of the data accesses and computations might indicate that the code components should be in, or remain situated in, a remote location (e.g., in middleware or in a back-end computing environment). Orchestrating the communications between applications and out-of-process code components can add operational complexities, however such complexities might be acceptable in the context of the specific, then-current characteristics pertaining to the data accesses and computations to be performed. Any of a wide range of data accesses, computations, network communications, and related performance metrics can be relevant to code component deployment decisions.

Unfortunately, application developers (e.g., from a cloud-based content management provider) might not know with sufficient certainty how various applications and/or associated code components will be used, and/or under what environmental constraints might be present. This problem in assessing the technology available to a user at some future moment in time hinders making code component deployment decisions that will yield the highest performance at such a future moment in time. Often, application usage patterns vary over time, resulting in changing use models and/or changing environments and possible degradation of performance for a certain code component deployment (e.g., combination of in-process and out-of-process code components).

Legacy approaches that deploy code components in a predetermined allocation to components in a distributed computing environment are therefore deficient at least in their ability to address the uncertainty in code component usage as it relates to performance. For example, a code component servicing requests for queries related to enterprise operations may have been deployed as an out-of-process code component when the mix of enterprise users was small, however as the mix of enterprise users increases, the inherent workloads demanded by such additional enterprise users can contribute to degradation of system performance.

What is needed is a technique or techniques to improve over legacy approaches.

SUMMARY

The present disclosure provides a detailed description of techniques used in systems, methods, and in computer program products for dynamic code component deployment in cloud-based service platforms.

The present disclosure provides systems, methods, and computer program products suited to address the aforementioned issues with legacy approaches. More specifically, the present disclosure provides a detailed description of techniques used in systems, methods, and in computer program products for dynamic code component deployment in cloud-based service platforms. Certain embodiments are directed to technological solutions for using a federator in an application to access code components that are dynamically deployed as in-process or out-of-process code components based on usage and/or performance metrics. The embodiments advance the relevant technical fields, as well as advancing peripheral technical fields. The disclosed embodiments modify and improve over legacy approaches. In particular, the herein-disclosed techniques provide technical solutions that address the technical problems attendant to deploying code components in a distributed computing system to maximize system performance. Such technical solutions serve to reduce use of computer memory, reduce demand for computer processing power, and reduce communication overhead needed. For example, the herein disclosed technical solutions and techniques serve to dynamically deploy certain code components (e.g., from out-of-process code components to in-process code components) so as to improve performance and/or reduce machine-to-machine communications over the Internet. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related to dynamic deployment of code components.

Some embodiments commence when an application seeks to perform a function over a content object. The application submits a request to perform the function on the content object, and the request is received by an application programming interface (API) processor. The API processor accesses a data structure comprising entries that relate the requested function to one or more code instances that are accessible at one or more code locations. An evaluator predicts performance of the function using a first location of a first code instance and compares that predicted performance to a predicted or measured performance of the same function using a second location of a second code instance that then implements the same function. The better performing code instance at the determined code location is invoked. Results are returned to the calling application.

Further details of aspects, objectives, and advantages of the technological embodiments are described herein and in the following descriptions, drawings, and claims.

BRIEF DESCRIPTION OF THE DRAWINGS

The drawings described below are for illustration purposes only. The drawings are not intended to limit the scope of the present disclosure.

FIG. 1A1 depicts dynamic code component deployment decision-making in a cloud-based service environment, according to some embodiments.

FIG. 1A2 present cloud-based service environments including cloud-based shared content management platforms that use dynamic code component deployment, according to some embodiments.

FIG. 1C depicts an application code deployment scenario in a distributed computing system.

FIG. 1D depicts an application code deployment technique implemented in systems for dynamic code component deployment in cloud-based service platforms, according to some embodiments.

DETAILED DESCRIPTION

Figure 1B:
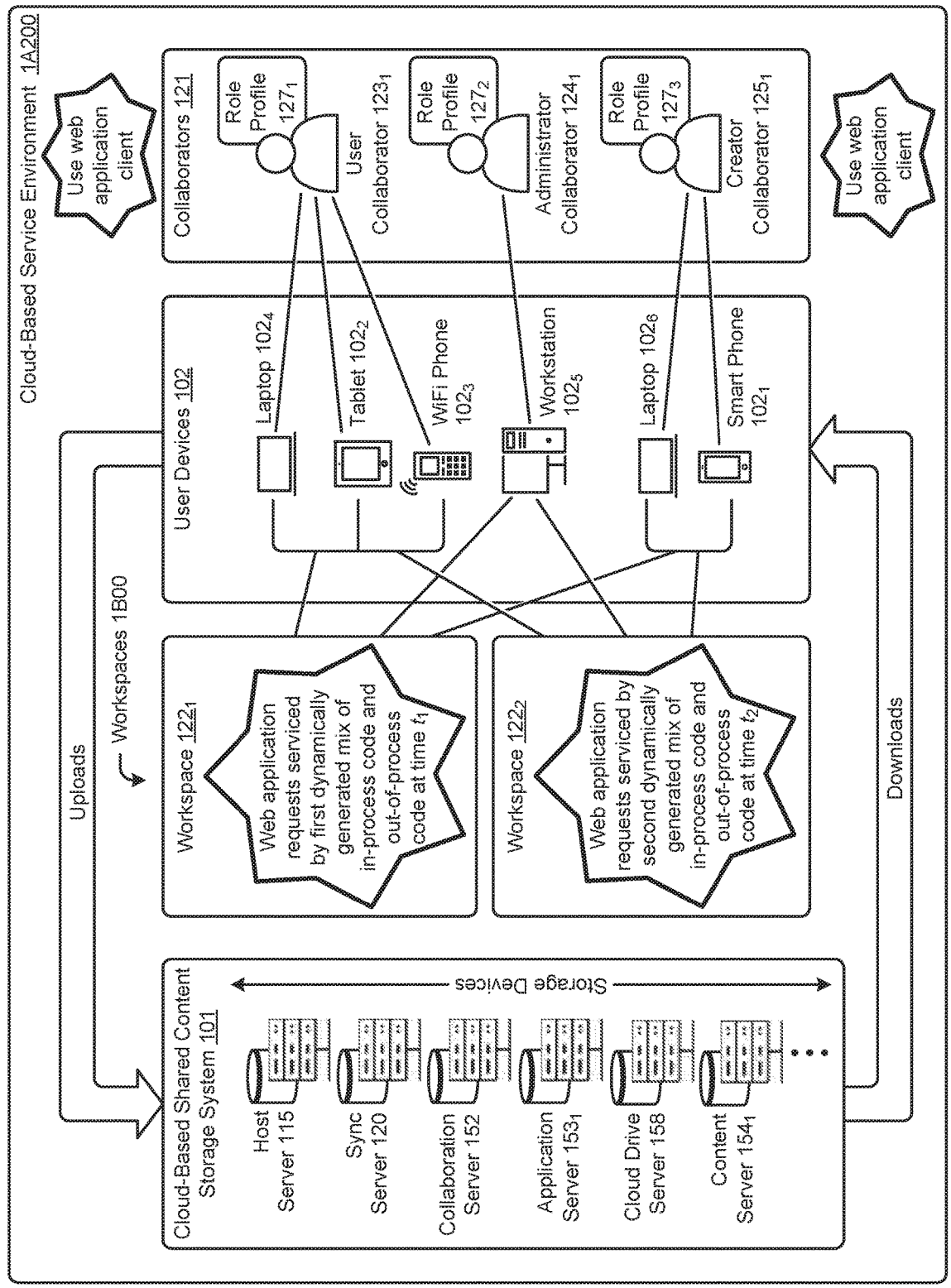
FIG. 1B presents a schematic view of workspaces populated with dynamically-created content generated from applications that are facilitated by dynamic code component deployment, according to some embodiments.

Some embodiments of the present disclosure address the problem of deploying code components in a distributed computing system to maximize system performance and some embodiments are directed to approaches for using a federator in an application to access code components that are dynamically deployed as in-process or out-of-process code components based on usage and/or performance metrics.

Overview

Disclosed herein are techniques for dynamically deploying code components as (1) in-process or (2) out-of-process code components based on measured performance data. A federator in the application further dynamically determines whether to use in-process code components and/or out-of-process code components based on the application request and/or performance data. In one or more embodiments, the federator can determine to dispatch an in-process (or out-of-process) code component. In some embodiments, the federator can trigger the deployment (e.g., composition, installation, etc.) of in-process code component(s) and/or out-of-process code component(s). In one or more embodiments, the code components can comprise an application programming interface (API) layer to facilitate deployment as in-process or out-of-process code components. In one or more embodiments, the in-process and/or out-of-process API requests can be the subject of analysis (e.g., projections) so as to abstract low order requests into higher order requests.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A1 depicts dynamic code component deployment decision-making in a cloud-based service environment where an application developer might not know with sufficient certainty how various applications and/or associated code components will be used, and/or under what environmental constraints might be present. As shown, a user interacts with one or more user devices, any of which might host a particular capability (e.g., see requested facility $103_1$). The user's operation of the user device results in requests (e.g., to a middleware components and/or to a backend components) which in turn results in responses (as shown).

An application developer might be aware of usage patterns at the moment of deployment of fielded capabilities, however usage patterns and environments vary over time, resulting in changing use models and/or changing environments. One way to address changing use models and changing environments is to dynamically make determinations as to what deployment is a best choice at some particular (e.g., then-current) moment in time. As shown, when an application requests an operation, a decision-making flow is entered, and determinations are made based on then-current conditions. For example, and as shown, when a user requests a particular function or facility (e.g., requested facility $103_1$), then a determination is made as to if the requested function can be performed or facilitated within the user's device. If so, aspects of that option are evaluated. Similarly, when an application requests a particular function or facility (e.g., requested facility $103_1$, requested facility $103_2$), then a determination is made as to if the requested function can be performed or facilitated within the user device, and/or can be performed or facilitated within another component (e.g., a middleware component, or a backend component, etc.). If so, aspects of those options are evaluated and one or more target locations are predicted. Such predictions can result in several possibilities, some of which can involve mapping the request to more than one facility, then an option to use one or more of a requested facility $103_1$ and/or a requested facility $103_2$ and/or a requested facility $103_3$ and/or a combination thereto is selected, and the requested function is executed using the selected option or combination.

Any of a wide range of data accesses and/or bandwidth requirements, computations, network communications, and related performance metrics can be relevant to prediction as well as to code component deployment decisions. More particularly, aspects of data accesses, computations, network communications, and related performance metrics can be used in making predictions upon which various code deployment decisions are based.

FIG. 1A2 presents a cloud-based service environment 1A200 including a cloud-based shared content management platform that uses dynamic code component deployment. As an option, one or more variations of a cloud-based service environment 1A200 or any aspect thereof may be implemented in the context of the architecture and functionality of the embodiments described herein. Also, the cloud-based service environment 1A200 or any aspect thereof may be implemented in any environment.

As shown, certain users (e.g., collaborators 121) having various collaboration roles (e.g., user collaborator $123_1$, administrator collaborator $124_1$, creator collaborator $125_1$, etc.) can use one or more instances of user devices 102 to interact with one or more workspaces (e.g., workspace $122_1$, workspace $122_2$, etc.) within the cloud-based service environment 1A200. The workspaces can be stored in any location, and are at least partially maintained by components within a cloud-based shared content storage system 101. The cloud-based shared content storage system 101 supports any variety of processing elements and/or storage devices (e.g., a storage filer, a storage facility, etc.) and/or servers such as a host server 115, a sync server 120, a collaboration server 152, an application server $153_1$, a cloud drive server 158, a content server $154_1$, etc.

Any of the users can access shared content (e.g., any single one or collections of the content objects) from the cloud-based shared content storage system 101 without the additional manually process of downloading and storing a file locally on an instance of the user devices 102 (e.g., smart phone $102_1$, tablet $102_2$, WiFi phone $102_3$, laptop $102_4$, workstation $102_5$, laptop $102_6$, etc.). For example, a content object (e.g., computer file, text document, audio file, video file, image file, etc.) created by the creator collaborator $125_1$ might be viewed by the user collaborator $123_1$ without informing the user collaborator $123_1$ where the file is stored or without prompting the user collaborator $123_1$ for a directory in which to access the file. Such a facility streamlines the frequently repeated sharing and collaboration processes.

Functions and techniques performed by the cloud-based shared content storage system 101 and/or the client side components (e.g., user devices 102, a web application client on an instance of the user devices 102, etc.) are described herein with further details and with reference to several examples.

FIG. 1B presents a schematic view of workspaces 1B00 populated with dynamically-created content generated from applications that are facilitated by dynamic code component deployment. As an option, one or more variations of workspaces 1B00 or any aspect thereof may be implemented in the context of the architecture and functionality of the embodiments described herein. Also, the workspaces $1B00$ or any aspect thereof may be implemented in any environment.

The embodiment shown in FIG. 1B is merely one example implementation of the cloud-based service environment $1A200$ where two or more of the collaborators $121$ use a web application client operating on an instance of the user devices $102$ to facilitate sharing a content object (e.g., computer file, electronic document, image, etc.), and where each collaborator has a certain access (e.g., for viewing, editing, downloading, etc.) to the shared object in a respective collaborator-specific workspace (e.g., workspace $122_1$ and workspace $122_2$ presented by the web application client). Moreover, a collaborator (e.g., the user collaborator $123_1$, the administrator collaborator $124_1$, and the creator collaborator $125_1$) can have an associated role profile (e.g., a role profile $127_1$, a role profile $127_2$, and a role profile $127_3$, respectively). Such an associated role profile can comprise certain attributes such as user information (e.g., user ID, device ID, etc.) and/or user workspace metadata (e.g., file ID, etc.) and/or access permissions and/or role descriptions. One or more roles can be associated with one or more access configurations, and such roles and/or access configurations can be used in determining rules pertaining to how users share documents. Moreover, such roles and/or access configurations can be used in determining how users can view, preview, edit, download, sync, print, and otherwise access shared documents.

The embodiment shown in FIG. 1B indicates certain operations corresponding to a web application client configured to operate in systems implementing dynamic code component deployment. Specifically, web application requests associated with workspace $122_1$ at time $t_1$ can be serviced by a first dynamically-generated mix of in-process code components and out-of-process code components. Such in-process code components (e.g., a ".dll" file, a ".ocx" file, etc.) run in the web application client process, and such out-of-process code components (e.g., a ".exe" file, etc.) run in a process separate from the web application client process. For example, time $t_1$ might correspond to a time when there were limited enterprise users of the web application client such that servicing enterprise-related requests with out-of-process code components achieved target system performance goals.

As further shown, web application requests associated with workspace $122_2$ at time $t_2$ can be serviced by a second dynamically-generated mix of in-process code components and out-of-process code components. For example, time $t_2$ might correspond to a time when the number of enterprise users of the web application client had significantly increased such that servicing enterprise-related requests with in-process code components was required to achieve target system performance goals. Specifically, according to the herein disclosed techniques, the in-process code components for servicing the enterprise-related requests can be dynamically deployed (e.g., composed, installed, downloaded, etc.) in response to changes in the environment and/or system (e.g., increase in enterprise users, etc.).

An example of legacy code deployment techniques and an embodiment of the herein disclosed techniques for dynamic code component deployment are described in FIG. 1C and FIG. 1D, respectively.

FIG. 1C depicts an application code deployment scenario $1C00$ in a distributed computing system. As an option, one or more variations of application code deployment scenario $1C00$ or any aspect thereof may be implemented in the context of the architecture and functionality of the embodiments described herein. Also, the application code deployment scenario $1C00$ or any aspect thereof may be implemented in any environment.

FIG. 1C represents one example of an application code deployment scenario $1C00$ in a distributed computing system. Specifically, an application $104_1$ (e.g., web application client) is shown operating on an instance of an application server $153_2$. The user collaborator $123_1$ can interact with the application $104_1$ using a user device $102_7$. For example, the application $104_1$ might be a web application client presented to the user collaborator $123_1$ in a browser on the user device $102_7$. Certain interactions by the user collaborator $123_1$ with the application $104_1$ might invoke various instances of application requests (e.g., app requests $192_1$) issued from the user device $102_7$ to the application server $153_2$. In some cases, the app requests $192_1$ might be serviced by the code comprising the application $104_1$ on the application server $153_2$. In other cases, and as shown, the application $104_1$ might respond to the app requests $192_1$ by issuing one or more machine-to-machine requests to a set of core logic $164_1$ operating on a content server $154_2$. Such requests might be configured to interface with an API layer (e.g., core API $162_1$) associated with the core logic $164_1$. As an example, code components facilitating web page control and rendering might be allocated by a code developer to the application $104_1$, while code components comprising back-end functional business logic might be allocated by a code developer to the core logic $164_1$. In this case, any instances of app requests $192_1$ requiring business logic processing would be routed to the core logic $164_1$ on the content server $154_2$. A set of application responses (e.g., app responses $193_1$) can then be returned to the user device $102_7$ (e.g., to update the browser user interface) based on the results determined by the application $104_1$ and/or the core logic $164_1$.

The application code deployment scenario $1C00$ described in the foregoing can have limitations. Specifically, the fixed allocation of code components to the application $104_1$ and the core logic $164_1$ can negatively affect system performance and/or the experience of the user collaborator $123_1$. For example, certain instances of app requests $192_1$ that require multiple machine-to-machine requests (e.g., from the application server $153_2$ to the content server $154_2$) can increase response times at the user device $102_7$. As another example, certain code components included in the application $104_1$ might be seldom called such that allocating such code components to a shared resource (e.g., the core logic $164_1$ on the content server $154_2$) might improve overall computing costs. In many cases, usage data (e.g., frequency of calls to APIs) and/or performance data (e.g., input/output performance) costs or time cost to call APIs) needed to make such allocation decisions might not be available to the code developers.

What is needed is a technique for dynamically deploying code components in a distributed computing system to maximize system performance. Such a technique for dynamic code component deployment in cloud-based service platforms is described in FIG. 1D and herein.

FIG. 1D depicts an application code deployment technique $1D00$ implemented in systems for dynamic code component deployment in cloud-based service platforms. As an option, one or more variations of application code deployment technique $1D00$ or any aspect thereof may be implemented in the context of the architecture and functionality of the embodiments described herein. Also, the application code deployment technique $1D00$ or any aspect thereof may be implemented in any environment.

The application code deployment technique 1D00 illustrates one embodiment of the implementation of the herein disclosed techniques for dynamic code component deployment in cloud-based service platforms. Specifically, the application code deployment technique 1D00 depicts the user collaborator $123_1$ interacting with an application $104_2$ operating in a process 190 at the application server $153_3$. For example, a set of app requests $192_2$ can be transmitted from the user device $102_7$ to the application server $153_3$ to interact with the application $104_2$ to return a set of app responses $193_2$. According to the application code deployment technique 1D00 and/or herein disclosed techniques, a federator $182_1$ can interface with the application $104_2$ to route the app requests $192_2$ to a set of in-process instances $186_1$ or a set of out-of-process code components. As shown, the in-process instances $186_1$ can operate in the process 190 with the application $104_2$ and the federator $182_1$. Further, the in-process instances $186_1$ can be accessed by the federator $182_1$ through an API layer (e.g., in-process API $184_1$) using a set of in-process requests $196_1$ and in-process responses $197_1$. Also, as an example, the out-of-process instances $166_1$ can be included in the core logic $164_2$ operating on the content server $154_3$. The out-of-process instances $166_1$ can be accessed by the federator $182_1$ through an API layer (e.g., core API $162_2$) using a set of out-of-process requests $194_1$. Any number of out-of-process responses $195_1$ can be returned to the requestor in response to all or portions of the set of out-of-process requests $194_1$.

The application code deployment technique 1D00 shown in FIG. 1D can facilitate dynamic code component deployment in cloud-based service platforms such as the dynamic code component deployment 198. For example, the number and/or measured performance of out-of-process requests $194_1$ for a certain one of the out-of-process instances $166_1$ might trigger (e.g., when the number and/or performance exceeds a threshold) dynamic deployment of the subject out-of-process instances to in-process instances. Such dynamic deployments might comprise automatically determining and/or composing the instances at the application server $153_3$. In some cases the code instances are automatically retrieved (e.g., from an instance repository accessible by the application server $153_3$,) and installed. As such, in-process instances can be redeployed to out-of-process instances. In other cases, all of the instances comprising the core logic $164_2$ can be deployed as in-process instances $186_1$ such that the application $104_2$ and the core logic $164_2$ operate in the process 190 on a single machine (e.g., application server $153_3$).

The foregoing dynamic instances deployment and/or other herein disclosed techniques address the problems attendant to dynamically deploying instances in a distributed computing system to maximize system performance. One embodiment of a system implementing such techniques is described in FIG. 2A.

Figure 2A:
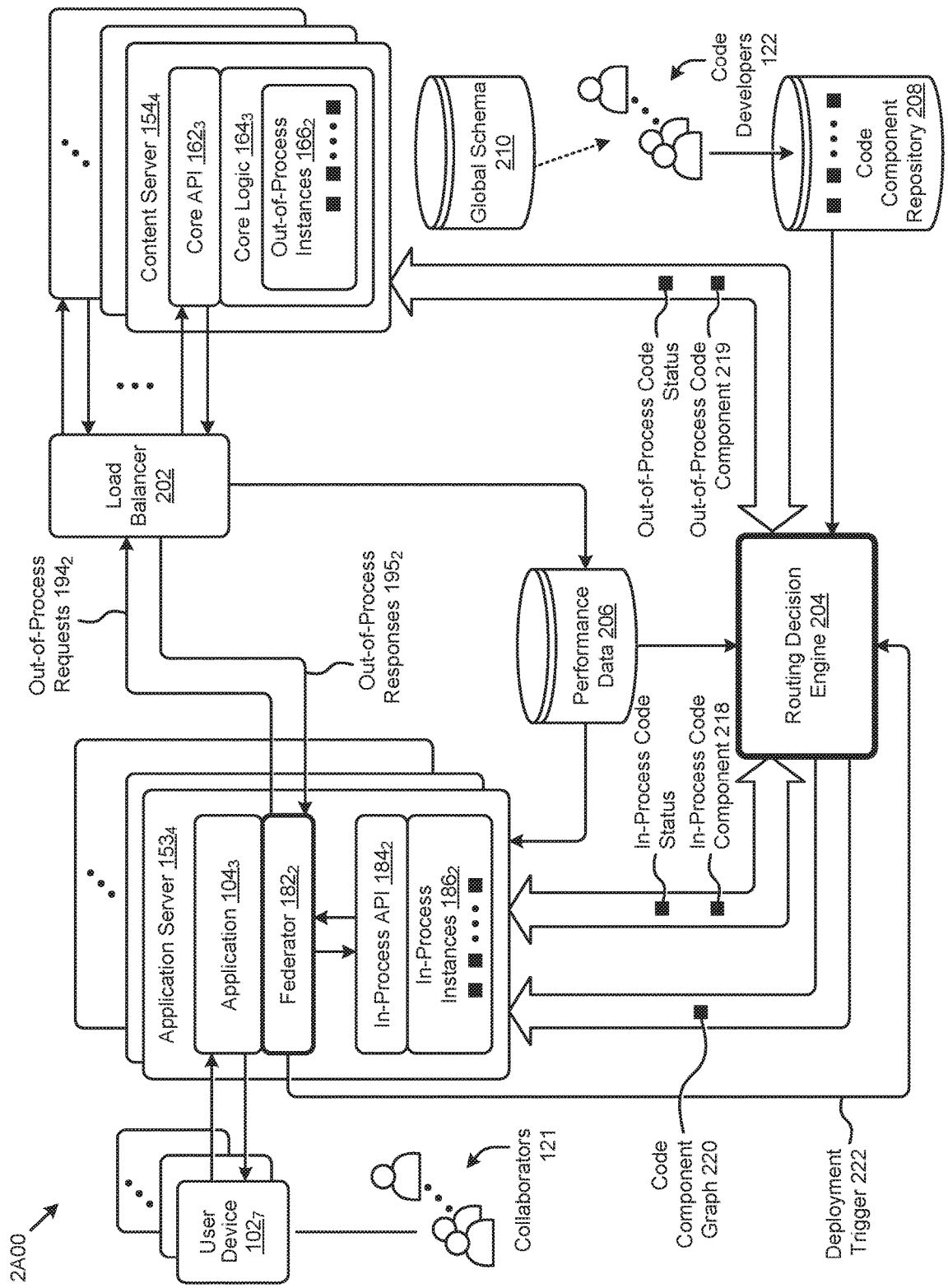
FIG. 2A is a schematic of a system used to implement techniques for dynamic code component routing in cloud-based service platforms, according to some embodiments.

FIG. 2A is a schematic of a system 2A00 used to implement techniques for dynamic code component routing in cloud-based service platforms. As an option, one or more variations of system 2A00 or any aspect thereof may be implemented in the context of the architecture and functionality of the embodiments described herein. Also, the system 2A00 or any aspect thereof may be implemented in any environment. The system 2A00 in FIG. 2A presents merely one partitioning. The specific example shown is purely exemplary, and other partitions are reasonable.

The system 2A00 depicts multiple users (e.g., collaborators 121) using a plurality of respective user devices (e.g., user device $102_7$) to interact with various instances of an application (e.g., application $104_3$) operating on a plurality of application servers (e.g., application server $153_4$). As shown, the application $104_3$ can operate in a process with a federator $182_2$ and a set of in-process code components $186_2$ having an API layer (e.g., in-process API $184_2$). In the embodiment depicted in system 2A00, the federator $182_2$ can access the out-of-process code components included in the core logic $164_3$ on the content server $154_4$ using a set of out-of-process requests $194_2$ and a set of out-of-process responses $195_2$. Specifically, the federator $182_2$ can issue the out-of-process requests $194_2$ to a load balancer 202 that can select an instance of a content server (e.g., the content server $154_4$) to service the request based on various criteria (e.g., then-current server processing load, network communication traffic, etc.). The load balancer 202 can forward the request to the selected server configured for interpretation by the core API $162_3$.

According to the shown embodiment, various other components can implement all or portions of the herein disclosed techniques. Specifically, a routing decision engine 204, a set of performance data 206, a code component repository 208, and a global schema 210 are shown. More specifically, code developers 122 can use the global schema 210 (e.g., a multi-tier schema) to develop various code components that can be stored in the code component repository 208. Applying a schema to the code components can facilitate execution of the code components at any point in time and to any location (e.g., tier, layer, etc.) in the system 2A00. For example, code components compliant with the global schema 210 can be deployed as in-process code components and/or out-of-process components.

Further, the routing decision engine 204 can access the code component repository 208 to determine a code component graph 220 for delivering to the various instances of the federator $182_2$. For example, the code component graph 220 can provide a mapping of the various locations (e.g., out-of-process server URLs, in-process DLLs, etc.) of certain code components to permit the federator to efficiently route application requests. The routing decision engine 204 can also process code components from the code component repository 208 so as to be included in the in-process code components $186_2$ (e.g., see in-process code component 218) or to be included in the out-of-process code components $166_2$ (e.g., see out-of-process code component 219). The location of a particular code component repository can depend on the nature of the included code components (e.g., localization code components), and/or can depend on the location of the called instance of the routing decision engine 204 can be based on the performance data 206 and/or an occurrence of a deployment trigger 222 from the federator $182_2$. For example, the performance data 206 might be derived from certain measurements (e.g., request to response latency, request count, etc.) performed by the load balancer 202. As another example, occurrences of the deployment trigger 222 can be issued by the federator $182_2$ when deployment of a certain code component is needed to service a received app request. In some cases, the federator $182_2$ can also use the performance data 206 to determine whether to route an app request to an in-process code component and/or an out-of-process code component.

Still further, the location of a particular code component repository can depend on the nature of the origin or sharing of the included code components. For example, a system such as the depicted system 2A00 can support hundreds or thousands or tens of thousands of users or more (e.g., enterprise collaborators) who, using a plurality of respective user devices, collaborate using applications (e.g., respective instances of application $104_3$). As such, a particular code component repository might be dedicated to an enterprise, and might be co-located with other data of the same enterprise. Still further, a particular code component repository and/or synchronized copies of that particular code component repository might be dedicated to an enterprise-to-enterprise or other enterprise-to-partner relationship. As such, a code component repository might be located (e.g., based on geography and/or based on network availability, etc.) so as to enhance the performance of applications used by collaborators involved in those relationships.

Techniques for moving code components between in-process and out-of-process environments is facilitated, in part, by the API layers and/or schema associated with the code components. Details pertaining to one embodiment of the code component structure are discussed as pertains to FIG. 2B.

Figure 2B:
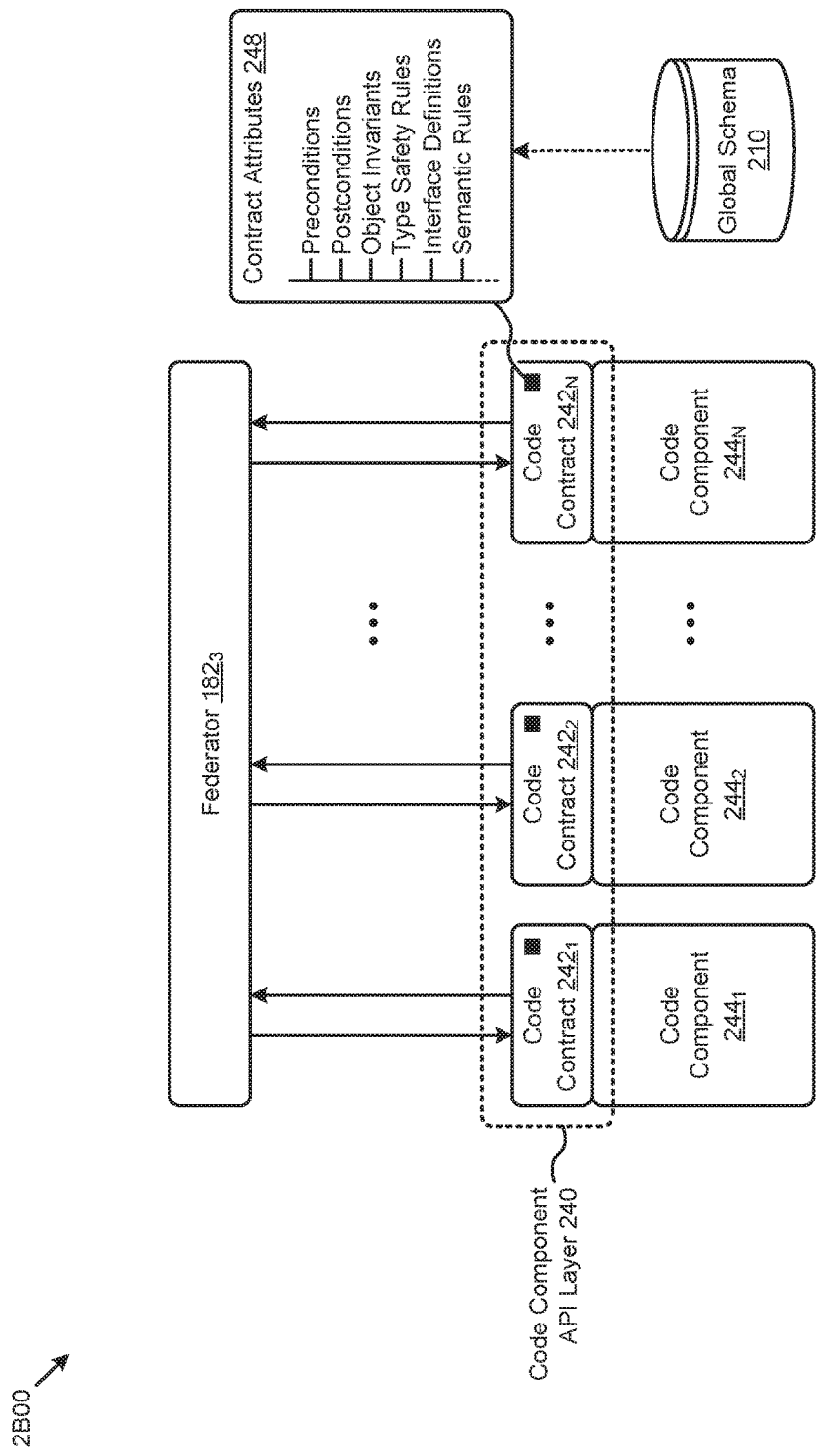
FIG. 2B illustrates a code component structure used to implement techniques for dynamic code component deployment in cloud-based service platforms, according to some embodiments.

FIG. 2B illustrates a code component structure 2B00 used to implement techniques for dynamic code component deployment in cloud-based service platforms. As an option, one or more variations of code component structure 2B00 or any aspect thereof may be implemented in the context of the architecture and functionality of the embodiments described herein. Also, the code component structure 2B00 or any aspect thereof may be implemented in any environment.

FIG. 2B shows a federator $182_3$ communicating with a plurality of code components (e.g., code component $244_1$, code component $244_2$, . . . , code component $244_N$), each having a respective instance of a code contract (e.g., code contract $242_1$, code contract $242_2$, . . . , code contract $242_N$). As an example, the code components might comprise programming code for processing operations corresponding to certain functional "end points" such as users, enterprises, permissions, files, folders, and/or other end points. Further, the code contracts can be characterized by a set of contract attributes 248 to form a code component API layer 240. The code contracts comprising the code component API layer 240 facilitate federator communication with the underlying code component when in-process or out-of-process, and/or as the underlying code changes.

As shown, the contract attributes 248 characterizing the code contracts specify a set of preconditions, post conditions, object invariants, type safety rules, interface definitions, semantic rules, and/or other attributes. For example, preconditions can describe requirements for entering a method or property. Post conditions can describe expected behavior when exiting a method or property. Further, object invariants can describe the expected state for a class that is in a good state. In some cases, code contracts can include classes for marking code, a static analyzer for compile-time analysis, a runtime analyzer, and/or other features. As shown, the contract attributes 248 can be derived from certain information (e.g., domain objects) comprising the global schema 210. As such, the federator $182_3$ also uses the global schema 210 to invoke valid transactions with the code contracts.

Figure 2C:
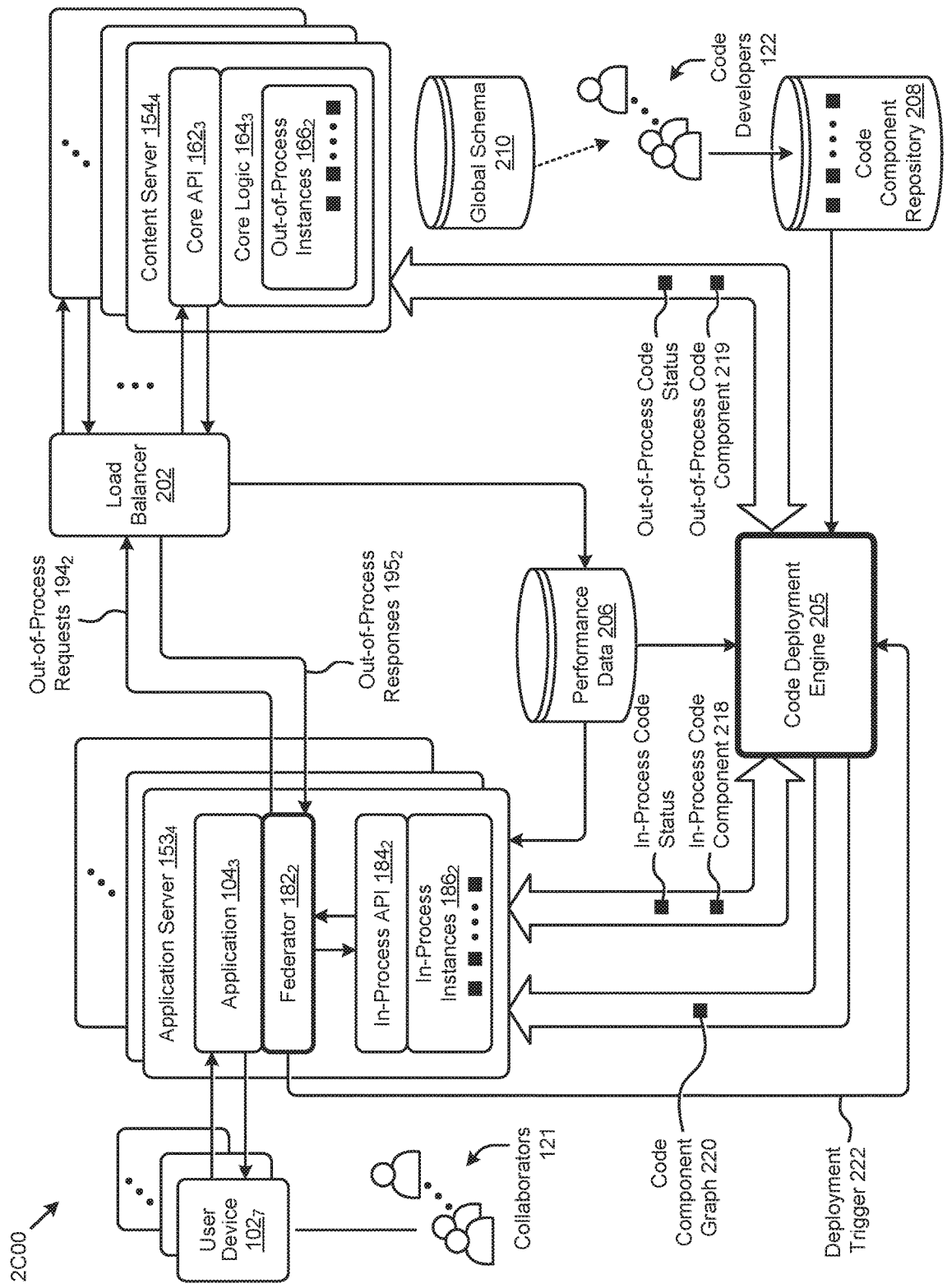
FIG. 2C is a schematic of a system used to implement techniques for dynamic code component deployment in cloud-based service platforms, according to some embodiments.

FIG. 2C is a schematic of a system 2C00 used to implement techniques for dynamic code component deployment in cloud-based service platforms. As an option, one or more variations of system 2C00 or any aspect thereof may be implemented in the context of the architecture and functionality of the embodiments described herein. Also, the system 2C00 or any aspect thereof may be implemented in any environment. The system 2C00 in FIG. 2C presents merely one partitioning. The specific example shown is purely exemplary, and other partitions are reasonable.

A code deployment engine 205 augments the functions of the heretofore-described routing decision engine 204. The code deployment engine 205 serves to deploy the code components at any point in time and to any location (e.g., tier, layer, etc.) in the system 2C00. For example, code components compliant with the global schema 210 can be deployed to be used as in-process code components and/or to be used as out-of-process components. Moreover, the acts of deployment and/or execution of code components can include steps for (1) moving code components to a particular repository, (2) performing security audit on the moved components, (3) taking security measures (e.g., adding security hardening) on the basis of the results of the security audit, and (4) confirming sufficient fidelity of the moved code component to any code contracts that are referenced or used in any API calls, or as used in any API processors. A code deployment engine 205, possibly in conjunction with a routing decision engine 204 can be used with an API processor (e.g., a federator) in a cloud-based service environment. One embodiment of a cloud-based service environment is shown in FIG. 2D and in FIG. 3.

Figure 2D:
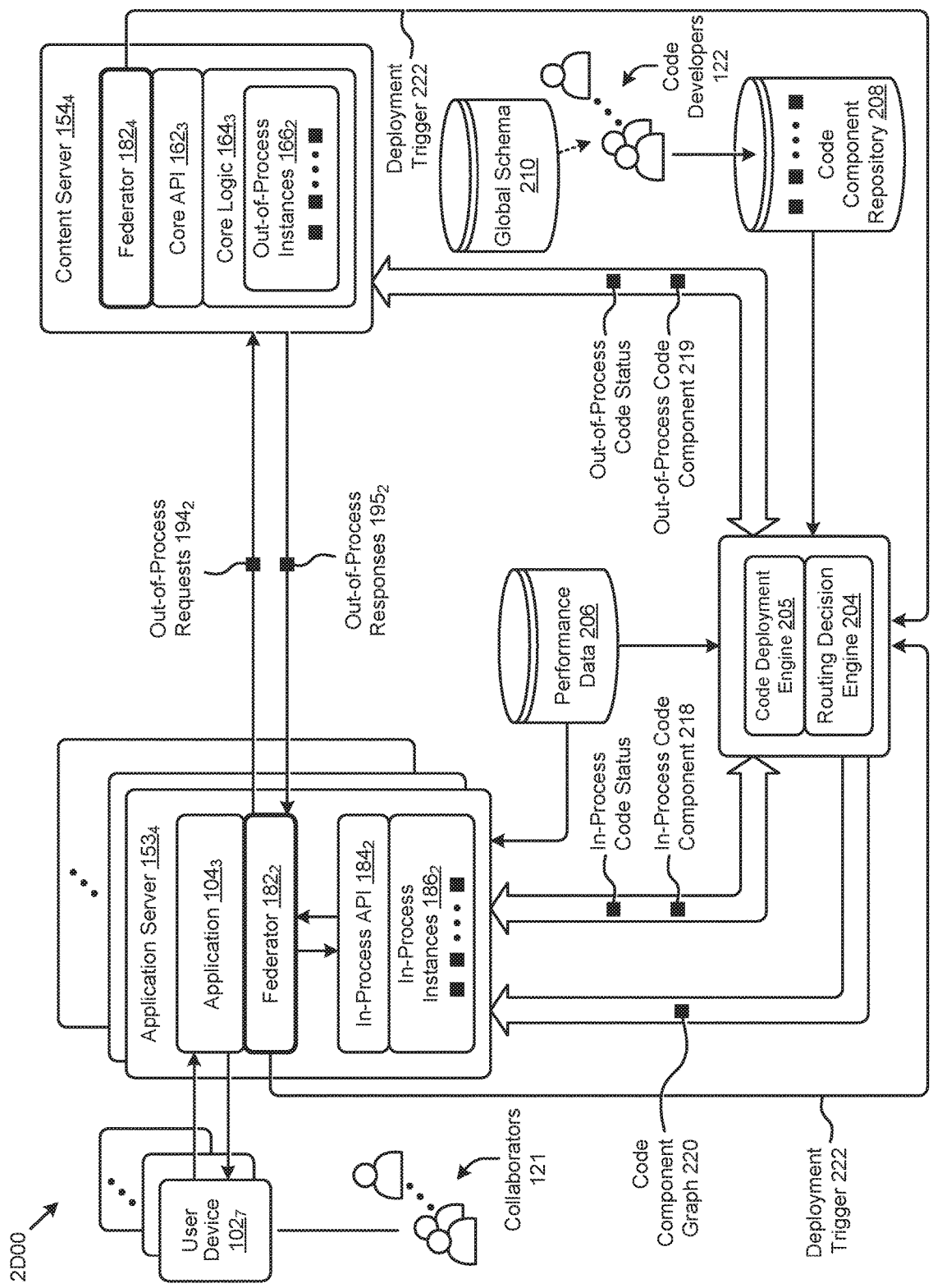
FIG. 2D is a schematic of a system used to implement techniques for dynamic code component usage in cloud-based service platforms, according to some embodiments.

FIG. 2D is a schematic of a system 2D00 used to implement techniques for dynamic code component usage in cloud-based service platforms. As shown, the routing decision engine 204 and a code deployment engine 205 operate in conjunction with each other. Also shown in FIG. 2D is coordination between a backend server and application servers. The backend server can avail itself of services of the application servers as may be needed to determine the existence of and location of a particular service. The particular embodiment of system 2D00 serves to combine a code deployment and code routing functions.

In some situations, using the systems and functions as described herein, a determination is made as to an optimal or desired location for a code-implemented service. At that moment in time, a check can be made to determine if the code-implemented service is indeed located and accessible at the desired location. If not, the code deployment engine 205 can be directed to retrieve code components from the code component directory, and to deploy the retrieved code components to the desired location. This sets up the situation where the same code (e.g., the code comprising the retrieved code component) is available as separate instances that are located at two or more locations. A selected one of the separate instances can be executed by a requestor from any location. The requestor need not be aware of the location of a particular code instance. Indeed, in embodiments such as is given in FIG. 2D, when a requestor uses an API call, the API implementation will check to determine if the code-implemented service is indeed located and accessible at the desired location.

In some cases, and as shown, an instance of a federator (e.g., federator $182_4$) can be situated in the back-end, which federator can be consulted by the back-end. Such an instance of a federator (e.g., federator $182_4$) can determine an optimal or desired location of a particular code component, which can depend on performance data 206. The back-end instance of a federator (e.g., federator $182_4$) can raise a deployment trigger 222 via the path to the code deployment engine 205, as shown.

Figure 3:
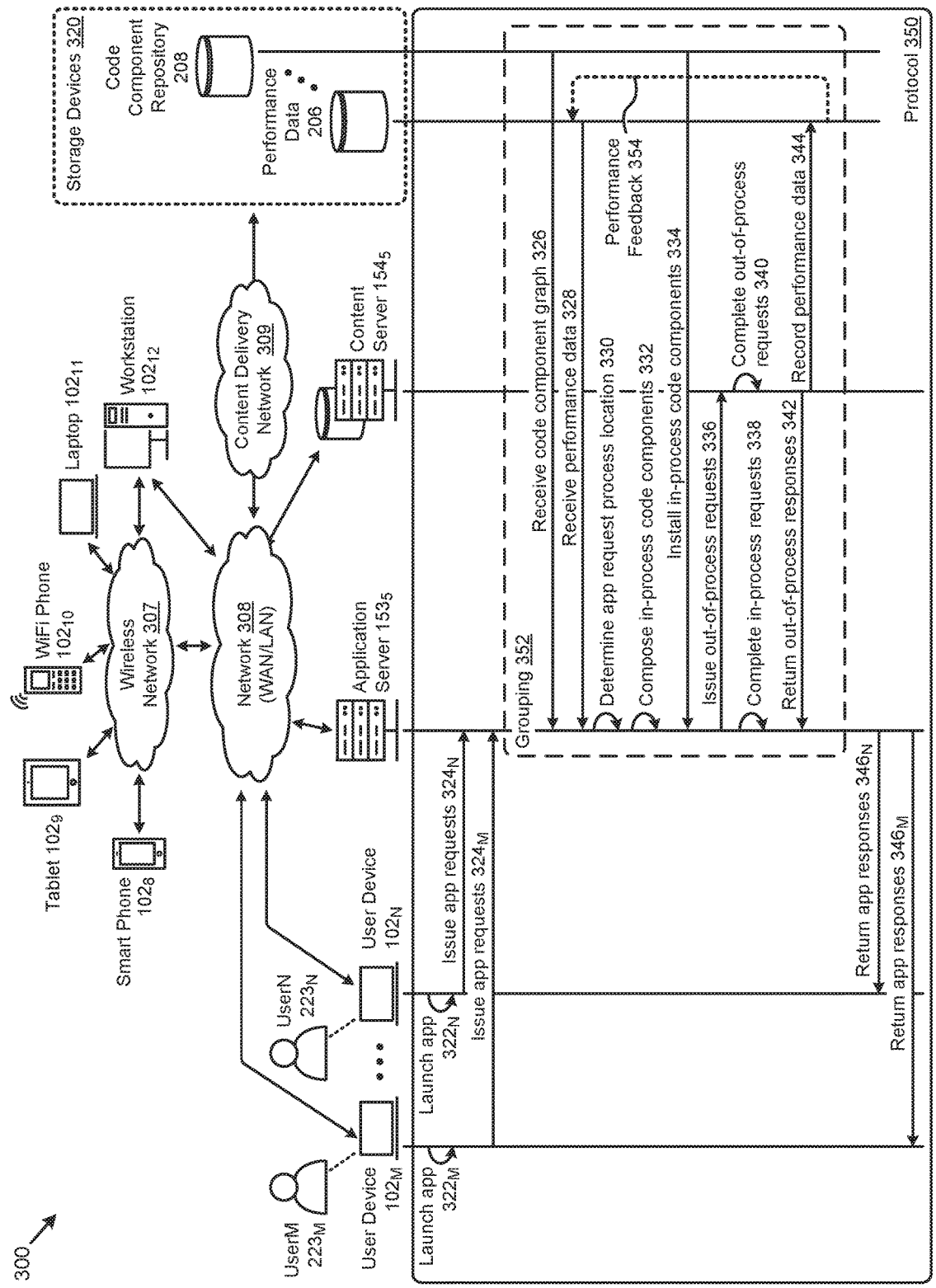
FIG. 3 depicts an environment that supports a protocol for dynamic code component deployment in cloud-based service platforms, according to some embodiments.

A protocol that serves the foregoing and other dynamic code component scenarios is given as pertains to FIG. 3.

FIG. 3 depicts an environment 300 that supports a protocol for dynamic code component deployment in cloud-based service platforms. As an option, one or more variations of environment 300 or any aspect thereof may be implemented in the context of the architecture and functionality of the embodiments described herein. Also, the environment 300 or any aspect thereof may be implemented in any environment.

As shown in FIG. 3, the environment 300 comprises various computing systems (e.g., servers and devices) interconnected by a wireless network 307, a network 308, and a content delivery network 309. The wireless network 307, the network 308, and the content delivery network 309 can comprise any combination of a wide area network (e.g., WAN), local area network (e.g., LAN), cellular network, wireless LAN (e.g., WLAN), or any such means for enabling communication of computing systems. The wireless network 307, the network 308, and the content delivery network 309 can also collectively be referred to as the Internet. The content delivery network 309 can comprise any combination of a public network and a private network. More specifically, environment 300 can comprise at least one instance of the application server $153_5$, at least one instance of the content server $154_5$, and a set of storage devices 320. The servers and storage devices shown in environment 300 can represent any single computing system with dedicated hardware and software, multiple computing systems clustered together (e.g., a server farm, a host farm, etc.), a portion of shared resources on one or more computing systems (e.g., a virtual server), or any combination thereof. For example, the application server $153_5$, the content server $154_5$, and the storage devices 320 can comprise a cloud-based content management platform that provides shared content management and storage services.

The environment 300 further comprises instances of user devices 102 (e.g., user device $102_M$, . . . , user device $102_N$) that can represent one of a variety of other computing devices (e.g., a smart phone $102_8$, a tablet $102_9$, a WiFi phone $102_{10}$, a laptop $102_{11}$, a workstation $102_{12}$, etc.) having software (e.g., application, web application client, etc.) and hardware (e.g., a graphics processing unit, display, monitor, etc.) capable of processing and displaying information (e.g., web page, graphical user interface, etc.) on a display. The user devices can further communicate information (e.g., web page request, user activity, electronic files, computer files, etc.) over the wireless network 307, the network 308, and the content delivery network 309. As shown, the user device $102_M$ can be operated by the userM $223_M$ and the user device $102_N$ can be operated by the userN $223_N$. Also, according to the herein disclosed techniques, the performance data 206, the code component repository 208, and/or other storage facilities can be included in the storage devices 320.

As shown, the user device $102_M$, the user device $102_N$, the application server $153_5$, the content server $154_5$, and the storage devices 320 can exhibit a set of high-level interactions (e.g., operations, messages, etc.) in a protocol 350. Specifically, and as shown, an instance of an application can be launched at the user device $102_M$ (see operation $322_M$) and an instance of the application can be launched at the user device $102_N$ (see operation $322_N$). Such an application, for example, might be provided by the cloud-based content management platform to facilitate high performance content sharing using the herein disclosed techniques. UserM $223_M$ and userN $223_N$ might interact with the application to invoke the issuance of certain app requests from the user devices to the application server $153_5$ (see message $324_M$ and message $324_N$, respectively).

As highlighted in the protocol 350, a grouping 352 can represent one embodiment of certain messages and operations used in systems and protocols for dynamic code component deployment. Specifically, such a grouping of interactions might commence with the application server $153_5$ receiving a code component graph from the code component repository 208 to determine the locations (e.g., out-of-process server URL, in-process DLLs, etc.) of available code components (see message 326). The application server $153_5$ might further receive performance data (e.g., statistics, request logs, etc.) from the performance data 206 (see message 328). Responsive to the received app requests (e.g., see message $324_M$ and message $324_N$), the application server $153_5$ can determine the location to process the app requests (see operation 330). Such determinations can be based on the code component graph, the performance data, and/or other criteria.

In some cases, the processing location can be determined to be in-process, yet no in-process code component is available. In such cases, the in-process code component can be dynamically composed (see operation 332) and/or installed from the code component repository (see message 334). For example, the performance data might indicate that a particular out-of-process code component (e.g., at the content server $154_5$) has been called a large number of times such that deploying that code component to an in-process environment (e.g., the application server $153_5$) might improve app response latencies. In this case, the code component can be deployed at the application server $153_5$ by dynamically composing the code component (e.g., based on a global schema) and/or downloading the code component from the code component repository for installation.

In other cases, the code component graph, performance data, and/or other information might indicate that the app requests can be processed by issuing one or more out-of-process requests (see message 336). The application server $153_5$ and the content server $154_5$ can then complete the in-process requests and the out-of-process requests (see operation 338 and operation 340, respectively). The content server $154_5$ can then return the out-of-process responses to the application server $153_5$ (see message 342). The content server $154_5$ can continuously monitor and record performance data associated with the out-of-process requests, out-of-process responses, and/or other activities (see message 344). Other sources contributing to the performance data 206 are possible. The in-process responses and/or the out-of-process responses can then be used to build the app responses to the user device $102_M$ and the user device $102_N$ (see message $346_M$ and message $346_N$, respectively).

The protocol 350 and the grouping 352 are merely one embodiment of certain messages and operations used in systems that use performance data (see operation 354) when determining dynamic code component deployment in cloud-based service platforms. Another embodiment is discussed as pertains to FIG. 4A.

Figure 4A:
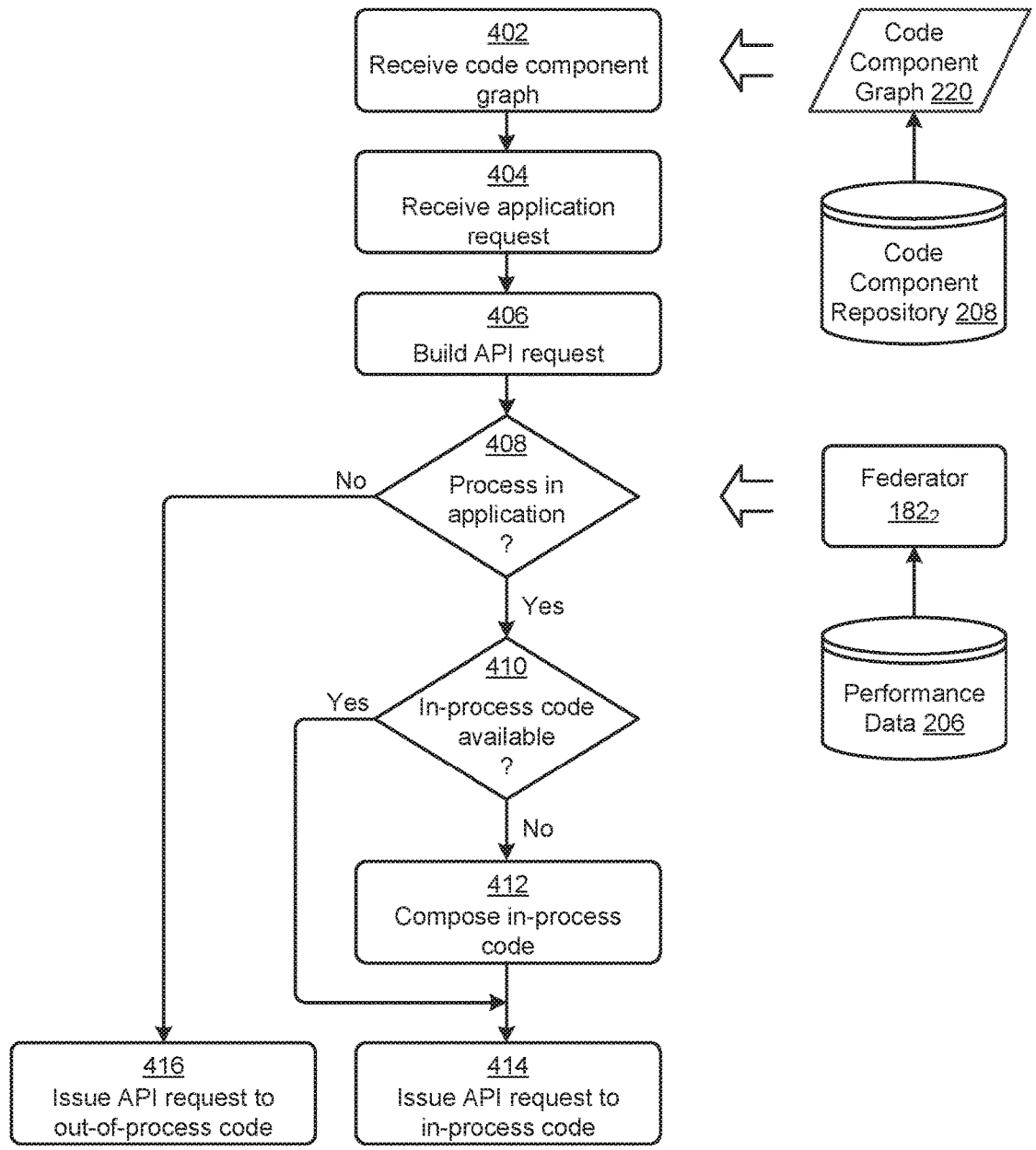
FIG. 4A is a schematic of a dynamic code component deployment technique for implementing dynamic code component deployment in cloud-based service platforms, according to an embodiment.

FIG. 4A is a schematic of a dynamic code component deployment technique 4A00 for implementing dynamic code component deployment in cloud-based service platforms. As an option, one or more variations of dynamic code component deployment technique 4A00 or any aspect thereof may be implemented in the context of the architecture and functionality of the embodiments described herein. Also, the dynamic code component deployment technique 4A00 or any aspect thereof may be implemented in any environment.

The dynamic code component deployment technique 4A00 presents one embodiment of certain steps for dynamically deploying code components using the herein disclosed techniques. In one or more embodiments the steps and underlying operations shown in the dynamic code component deployment technique 4A00 can be executed by the system 2A00 in a cloud-based shared content management platform. Certain components from system 2A00 (e.g., the federator $182_2$, the performance data 206, the code component repository 208, and the code component graph 220) are shown in FIG. 4A for reference.

Specifically, the dynamic code component deployment technique 4A00 can commence with receiving a code component graph (see step 402). For example, the received code component graph (e.g., code component graph 220) might be based on an index stored in the code component repository 208 indicating the location of various in-process and/or out-of-process code components. Various requests for an application to perform certain operations can also be received (see step 404). The shown technique might then build an API request to issue to one or more code components (see step 406). In some cases, the API request might be based on multiple application requests and/or represent (e.g., aggregate) multiple application requests. In other cases, multiple API requests might be built based on a fewer number of higher order application requests. More specifically, the dynamic code component deployment technique 4A00 might use certain code libraries to build projections of higher order requests. An example usage of such a projection builder library is shown in Table 1.

TABLE 1

Example API request using a Projection Builder library

| Ref | Code |
|---|---|
| 1 | $userProjectionBuilder = UserProjectionBuilder::getUserProjectionBuilder(true); |
| 2 | $isEnterpriseUser = $this->user->enterprise_id( ) > 0; |
| 3 | $userProjectionBuilder = $userProjectionBuilder->withUserEnterprise( ); |
| 4 | $userProjectionBuilder = $userProjectionBuilder->withUserEnterpriseTheme( ); |
| 5 | $projection = $userProjectionBuilder->build( ); |
| 6 | $fed = new Federator($transLookup); |
| 7 | $client = new UsersResourceClient($fed); |
| 8 | $res = $client->getUsers([1234], projection); |

Some implementations of the aforementioned projection builder library might include a hierarchy or graph or other data structure so as to facilitate mapping of a received query onto constituent operations. One example of such a graph is shown and discussed as pertains to FIG. 4B. Some possible uses of a query projection graph are provided in FIG. 4C.

Figure 4B:
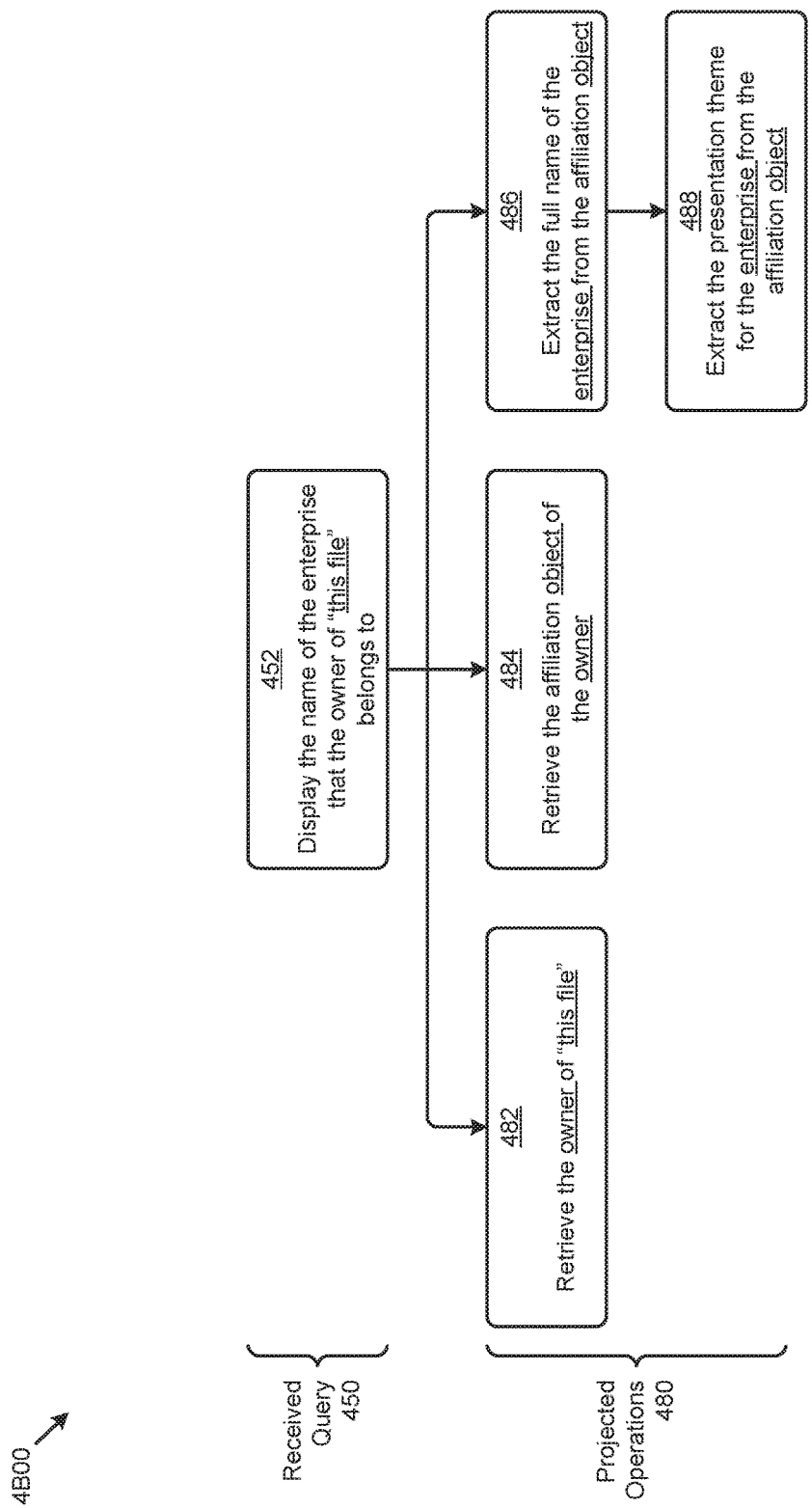
FIG. 4B depicts a query projection graph for implementing dynamic code component deployment in cloud-based service platforms, according to an embodiment.

FIG. 4B depicts a query projection graph 4B00 for implementing dynamic code component deployment in cloud-based service platforms. As an option, one or more variations of a query projection graph 4B00 or any aspect thereof may be implemented in the context of the architecture and functionality of the embodiments described herein.

An application request may include one or more queries and/or one or more implied queries. A graph such as is query projection graph 4B00 serves to receive one of the one or more queries and to project the semantics of the received query 450 onto a set of projected operations 480. The projected operations may include a set of operations and/or may further include additional queries.

In the shown example of query projection graph 4B00, an application request that has the semantics of, "display the name of the enterprise that the owner of this file belongs to" (see node 452). Using the query projection graph 4B00, those semantics can be projected onto several operations (e.g., projected operations 480), such as "retrieve the owner of the subject file" (see node 482), and "retrieve the affiliation object of the owner" (see node 484), and "extract the full name of the enterprise from the affiliation object" (see node 486), and "extract the presentation theme for the enterprise from the affiliation object" (see node 488).

Such a technique to project an application request over a projection graph to generate constituent operations can be used to direct processing. For example, the results of a projection might be multiple operations that are executed serially or in parallel. The results of the multiple operations are collected so as to build a collated response to the received application request. Strictly as one example, the code in Table 1 can build a response (e.g., $res) based on a projection (e.g., $projection) that includes all of the fields needed to render a user profile web page (e.g., the theme, the enterprise, the owner, etc.). The projection serves to reduce the number of and/or complexities of application requests as may be necessary to render a web page and/or a portion of a web page.

Some implementations of the projection operations abstract to a higher order the complexities of a requested query. Some implementations of techniques to determine projection operations receive an application request (e.g., which may be a query or may comprise a query) and in turn process many fields, and possibly generate additional queries (see FIG. 4B and FIG. 4C), and/or additional lower order requests. A lower order request corresponding to the example API request of Table 1 is shown in Table 2.

TABLE 2

Example low order API request

| Ref | Code |
|---|---|
| 1 | http://www.example.com/server/user(1234) (id,name,email, login,isAnonymous,isTrashEnabled,isMaster,isSubmaster, isGroupSubmaster,usesVIPBranding,isReseller,appSettings (isEditEnabled,isSyncEnabled,isOfficeOnlineEnabled, pictureUrls,accountPlan,needsTermsOfService,language, enterprise:EnterpriseRecord(id,emailDomains,theme: ThemeRecord)) |

Referring again to the dynamic code component deployment technique 4A00 in FIG. 4A, when the API request is built, the target process for the API request can be determined (see decision 408). In some embodiments, a federator (e.g., federator $182_2$) can make the determination based in part on performance data (e.g., performance data 206) related to the system and/or environment. If an out-of-process target is selected (see "No" path of decision 408), then the API request can be issued to an out-of-process code component (see step 416). If an in-process target is selected (see "Yes" path of decision 408), the availability of the in-process code component can be determined (see decision 410). If the in-process code component is available (see "Yes" path of decision 410), then the API request can be issued to the in-process code component (see step 414). In other cases, for example, an in-process target might be selected with knowledge that the in-process code component is not available and thus trigger a dynamic in-process code deployment. In such cases, the in-process code component can be dynamically composed (see step 412). For example, the code component can be composed (e.g., auto-generated, downloaded, installed, etc.) based on information in the code component repository 208, a global schema, and/or other data and/or logic.

The techniques of FIG. 4A and FIG. 4B can be combined into a high-performance decision flow. A schematic showing such a combination is provided in FIG. 4C.

Figure 4C:
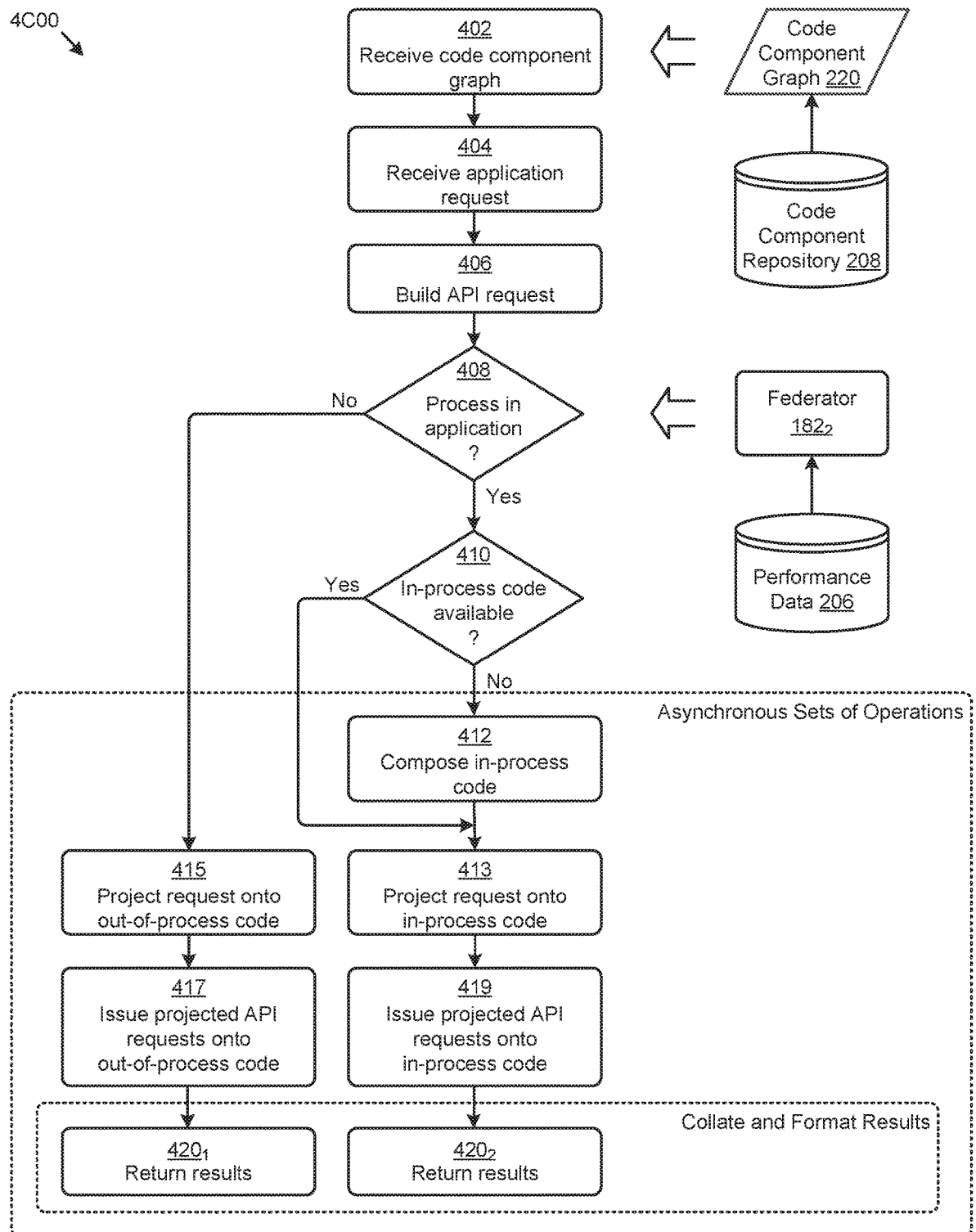
FIG. 4C is a schematic of a query projection technique for implementing dynamic code component deployment in cloud-based service platforms, according to an embodiment.

FIG. 4C is a schematic of a query projection technique 4C00 for implementing dynamic code component deployment in cloud-based service platforms. As an option, one or more variations of query projection technique 4C00 or any aspect thereof may be implemented in the context of the architecture and functionality of the embodiments described herein.

The shown flow includes steps to receive an application request (see step 404), steps to project a request onto out-of-process code such as out-of-process APIs (see step 415), and steps to project a request onto in-process code such as in-process APIs (see step 413). Further, the flow includes steps to issue projected API requests onto out-of-process code (see step 417), and steps to issue projected API requests onto in-process code (see step 419). After issuing the determined in-process API(s) and/or after issuing the determined out-of-process API(s), the results from the API calls are received. When the individual operations are completed (e.g., when the results from the API calls are received), it is sometimes necessary to collate the various responses into a single response that is suitable for returning to the caller. In some cases, the single response that is suitable for returning to the caller reflects the graph-that was used (see step 402) for building the API requests (see step 406). In some embodiments, a federator performs collation activities by collapsing association links (e.g., see the underscored terms of FIG. 4B) between the various individual operation responses (e.g., see the multiple uses of "this file", "owner", "object", and "enterprise"). For example, in a request for the name of the enterprise of a given user, the response containing information about the user will contain a link that points to the enterprise, which the federator replaces with the full information about the enterprise as taken from (for example) the affiliation object. In this way, the federator combines a series of individual responses into a single response that comports with the format as given or imputed in the incoming request. In some cases the resulting collapsed, collated and formatted results comport with one or more contract attributes.

Such collation and formatting can commence at any moment in time after issuing the determined in-process API(s) and/or after issuing the determined out-of-process API(s). Results from the API calls can be received and processed in an asynchronous manner. As shown, the asynchronously returned results can be collated and formatted based on a data-determined schedule before returning the results (see step $420_1$, and step $420_2$).

Additional Embodiments of the Disclosure

Additional Practical Application Examples

Figure 5A:
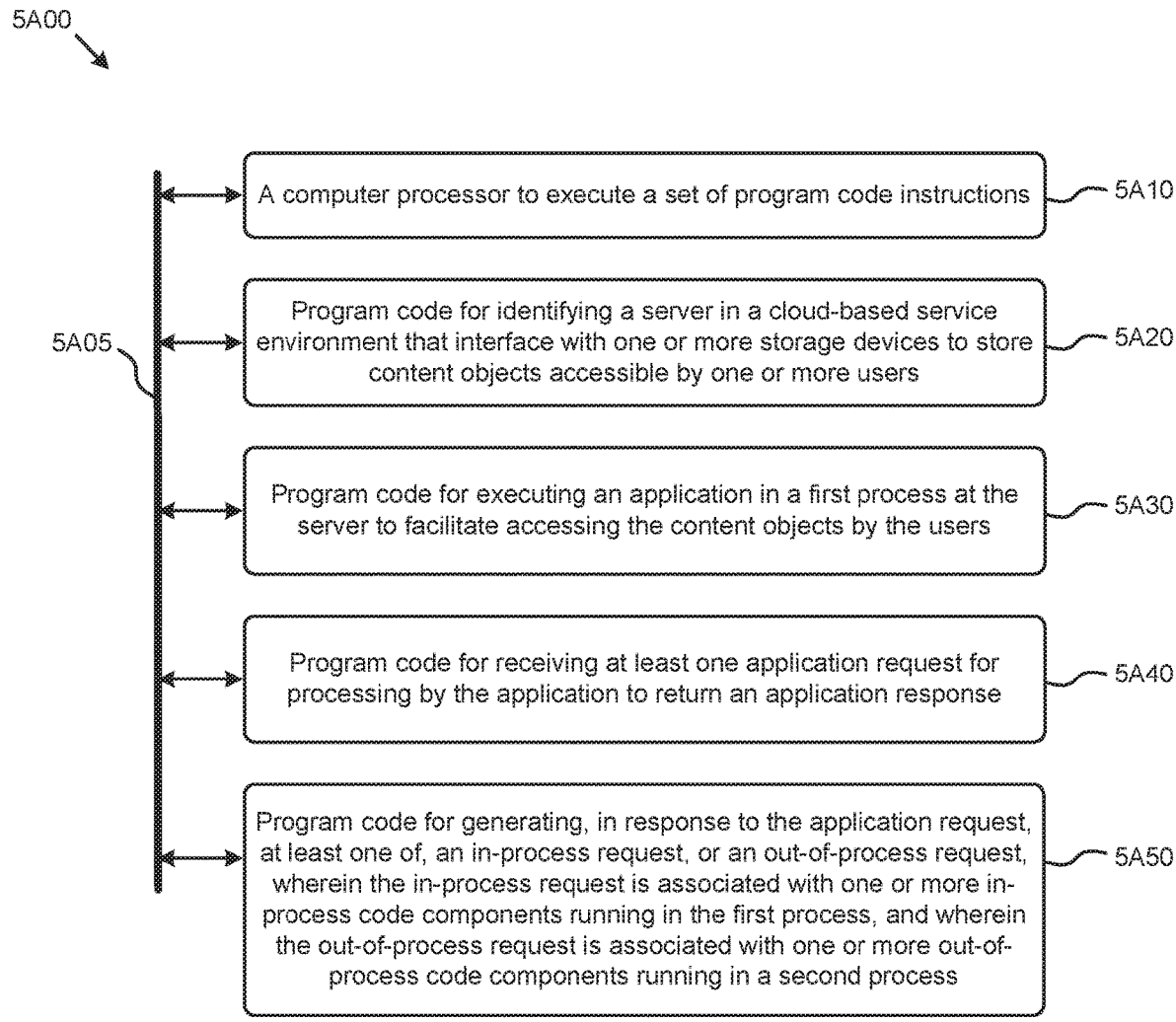
FIG. 5A and FIG. 5B depict system components as arrangements of computing modules that are interconnected so as to implement certain of the herein-disclosed embodiments.

FIG. 5A depicts a system 5A00 as an arrangement of computing modules that are interconnected so as to operate cooperatively to implement certain of the herein-disclosed embodiments. The partitioning of system 5A00 is merely illustrative and other partitions are possible. As an option, the system 5A00 may be implemented in the context of the architecture and functionality of the embodiments described herein. Of course, however, the system 5A00 or any operation therein may be carried out in any desired environment.

The system 5A00 comprises at least one processor and at least one memory, the memory serving to store program instructions corresponding to the operations of the system. As shown, an operation can be implemented in whole or in part using program instructions accessible by a module. The modules are connected to a communication path 5A05, and any operation can communicate with other operations over communication path 5A05. The modules of the system can, individually or in combination, perform method operations within system 5A00. Any operations performed within system 5A00 may be performed in any order unless as may be specified in the claims.

The shown embodiment implements a portion of a computer system, presented as system 5A00, comprising a computer processor to execute a set of program code instructions (see module 5A10) and modules for accessing memory to hold program code instructions to perform: identifying a server in a cloud-based service environment that interfaces with one or more storage devices to store content objects accessible by one or more users (see module 5A20); executing an application in a first process at the server to facilitate accessing the content objects by the users (see module 5A30); receiving at least one application request for processing by the application to return an application response (see module 5A40); generating, in response to the application request, at least one of, an in-process request, or an out-of-process request, wherein the in-process request is associated with one or more in-process code components running in the first process, and wherein the out-of-process request is associated with one or more out-of-process code components running in a second process (see module 5A50).

Some embodiments can include one or more variations such as:

- A variation in which at least one in-process code component comprises the in-process code components.
- A variation in which the in-process code component comprises installing the in-process code component from a code component repository.
- A variation in which the in-process code component is based at least in part on one of, the application request, or a set of performance data.
- A variation that further comprises determining the performance data at the server.
- A variation in which generating the in-process request or the out-of-process request is based at least in part on a code component graph.
- A variation in which at least one of, the in-process code components, or the out-of-process code components, comprises an API layer.
- A variation in which the API layer is characterized by one or more contract attributes, the contract attributes comprising at least one of, preconditions, post conditions, object invariants, type safety rules, interface definitions, or semantic rules.

Figure 5B:
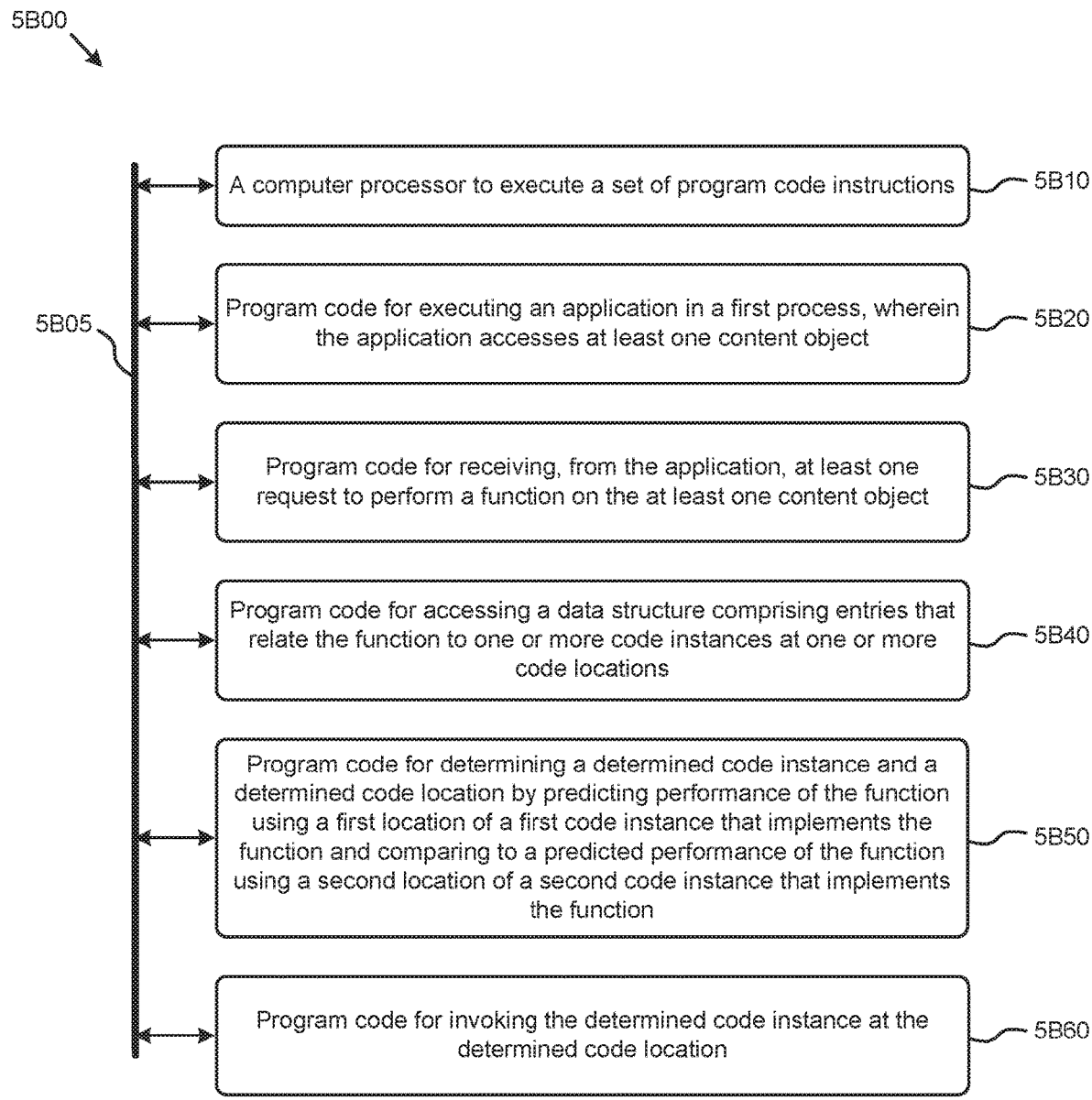

FIG. 5B depicts a system 5B00 as an arrangement of computing modules that are interconnected so as to operate cooperatively to implement certain of the herein-disclosed embodiments. The partitioning of system 5B00 is merely illustrative and other partitions are possible. As an option, the system 5B00 may be implemented in the context of the architecture and functionality of the embodiments described herein. Of course, however, the system 5B00 or any operation therein may be carried out in any desired environment.

The system 5B00 comprises at least one processor and at least one memory, the memory serving to store program instructions corresponding to the operations of the system. As shown, an operation can be implemented in whole or in part using program instructions accessible by a module. The modules are connected to a communication path 5B05, and any operation can communicate with other operations over communication path 5B05. The modules of the system can, individually or in combination, perform method operations within system 5B00. Any operations performed within system 5B00 may be performed in any order unless as may be specified in the claims.

The shown embodiment implements a portion of a computer system, presented as system 5B00, comprising a computer processor to execute a set of program code instructions (see module 5B10) and modules for accessing memory to hold program code instructions to perform: executing an application in a first process, wherein the application accesses at least one content object (see module 5B20); receiving, from the application, at least one request to perform a function on the at least one content object (see module 5B30); accessing a data structure comprising entries that relate the function to one or more code instances at one or more code locations (see module 5B40); determining a determined code instance and a determined code location by predicting performance of the function using a first location of a first code instance that implements the function and comparing to a predicted performance of the function using a second location of a second code instance that implements the function (see module 5B50); and invoking the determined code instance at the determined code location (see module 5B60).

System Architecture Overview

Additional System Architecture Examples

Figure 6A:
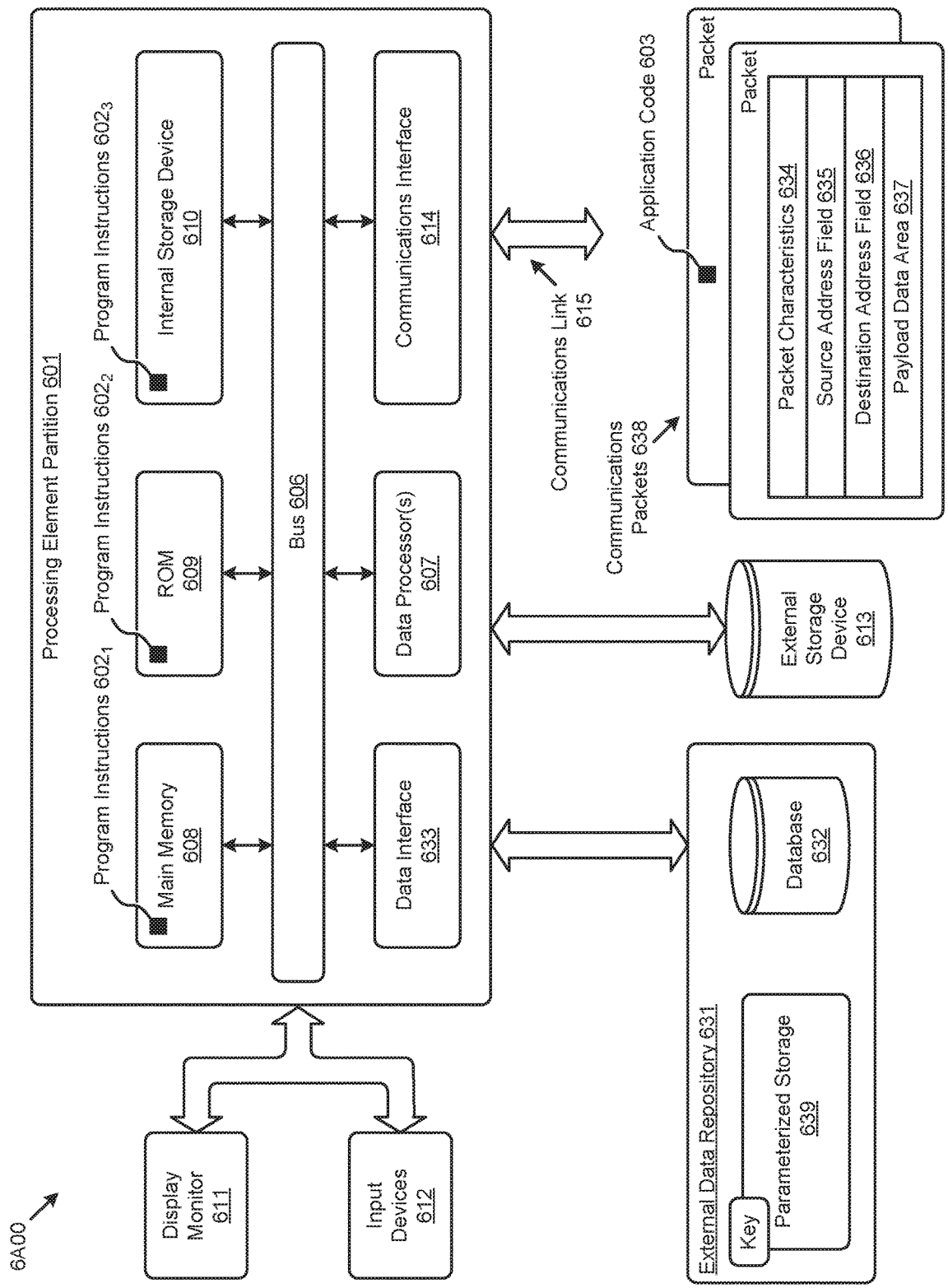
FIG. 6A and FIG. 6B present block diagrams of computer system architectures having components suitable for implementing embodiments of the present disclosure, and/or for use in the herein-described environments.

FIG. 6A depicts a block diagram of an instance of a computer system 6A00 suitable for implementing embodiments of the present disclosure. Computer system 6A00 includes a bus 606 or other communication mechanism for communicating information. The bus interconnects subsystems and devices such as a central processing unit (CPU), or a multi-core CPU (e.g., data processor 607), a system memory (e.g., main memory 608, or an area of random access memory (RAM)), a non-volatile storage device or non-volatile storage area (e.g., read-only memory 609), an internal storage device 610 or external storage device 613 (e.g., magnetic or optical), a data interface 633, a communications interface 614 (e.g., PHY, MAC, Ethernet interface, modem, etc.). The aforementioned components are shown within processing element partition 601, however other partitions are possible. The shown computer system 6A00 further comprises a display 611 (e.g., CRT or LCD), various input devices 612 (e.g., keyboard, cursor control), and an external data repository 631.

According to an embodiment of the disclosure, computer system 6A00 performs specific operations by data processor 607 executing one or more sequences of one or more program code instructions contained in a memory. Such instructions (e.g., program instructions $602_1$, program instructions $602_2$, program instructions $602_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 6A00 performs specific networking operations using one or more instances of communications interface 614. Instances of the communications interface 614 may comprise one or more networking ports that are configurable (e.g., pertaining to speed, protocol, physical layer characteristics, media access characteristics, etc.) and any particular instance of the communications interface 614 or port thereto can be configured differently from any other particular instance. Portions of a communication protocol can be carried out in whole or in part by any instance of the communications interface 614, and data (e.g., packets, data structures, bit fields, etc.) can be positioned in storage locations within communications interface 614, or within system memory, and such data can be accessed (e.g., using random access addressing, or using direct memory access DMA, etc.) by devices such as data processor 607.

The communications link 615 can be configured to transmit (e.g., send, receive, signal, etc.) any types of communications packets 638 comprising any organization of data items. The data items can comprise a payload data area 637, a destination address 636 (e.g., a destination IP address), a source address 635 (e.g., a source IP address), and can include various encodings or formatting of bit fields to populate the shown packet characteristics 634. In some cases the packet characteristics include a version identifier, a packet or payload length, a traffic class, a flow label, etc. In some cases the payload data area 637 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 607 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 631, which in turn can be formatted into any one or more storage areas, and which can comprise parameterized storage 639 accessible by a key (e.g., filename, table name, block address, offset address, etc.).

Execution of the sequences of instructions to practice certain embodiments of the disclosure are performed by a single instance of the computer system 6A00. According to certain embodiments of the disclosure, two or more instances of computer system 6A00 coupled by a communications link 615 (e.g., LAN, PTSN, or wireless network) may perform the sequence of instructions required to practice embodiments of the disclosure using two or more instances of components of computer system 6A00.

The computer system 6A00 may transmit and receive messages such as data and/or instructions organized into a data structure (e.g., communications packets). The data structure can include program instructions (e.g., application code 603), communicated through communications link 615 and communications interface 614. Received program code may be executed by data processor 607 as it is received and/or stored in the shown storage device, or in or upon any other non-volatile storage for later execution. Computer system 6A00 may communicate through a data interface 633 to a database 632 on an external data repository 631. Data items in a database can be accessed using a primary key (e.g., a relational database primary key).

The processing element partition 601 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 607. Some embodiments include one or more special-purpose hardware components (e.g., power control, logic, sensors, transducers, etc.). A module may include one or more state machines and/or combinational logic used to implement or facilitate the operational and/or performance characteristics of dynamic code component deployment in cloud-based service platforms.

Various implementations of the database 632 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of dynamic code component deployment in cloud-based service platforms). Such files or records can be brought into and/or stored in volatile or non-volatile memory.

Figure 6B:
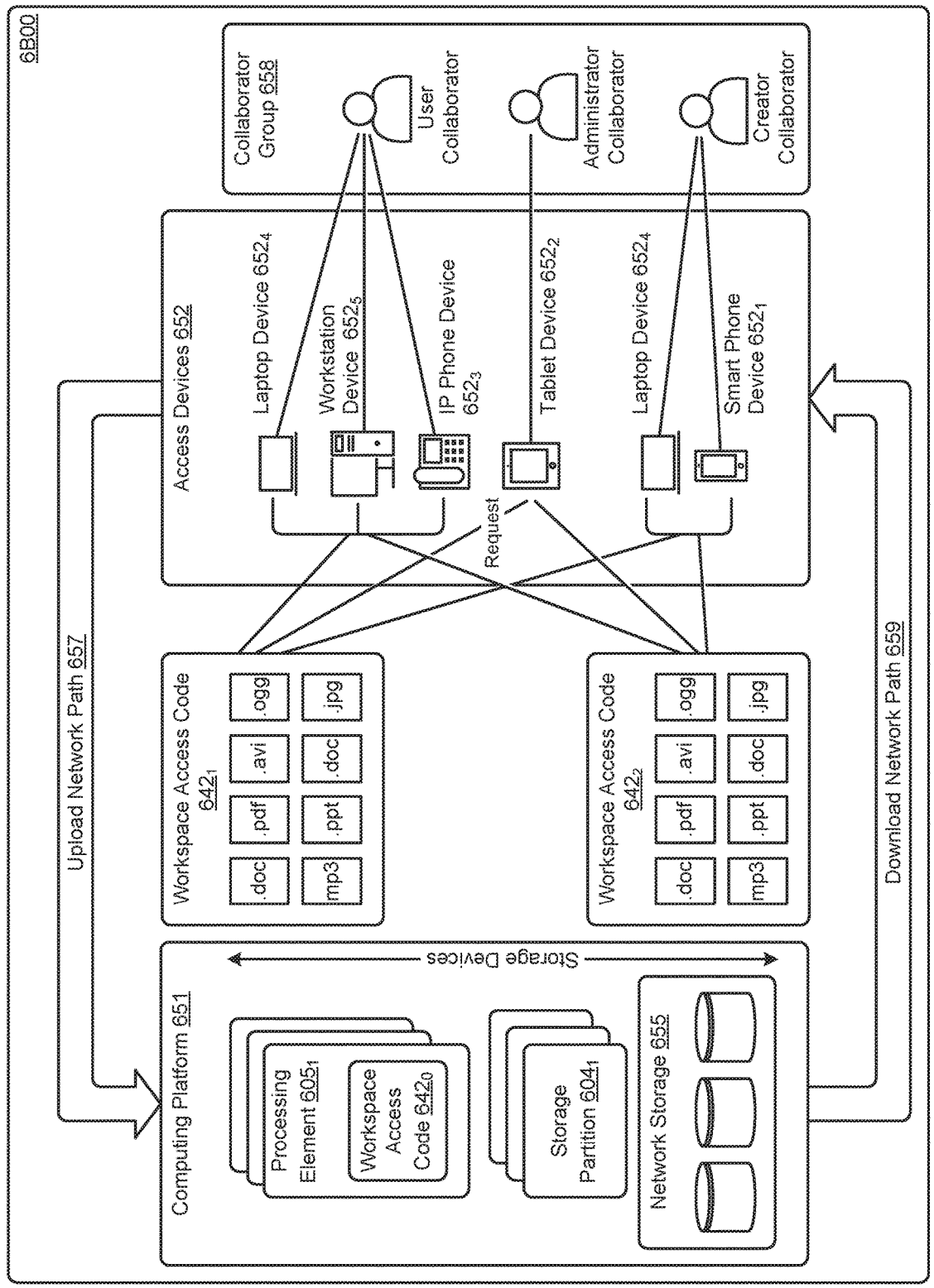

FIG. 6B depicts a block diagram of an instance of a cloud-based service environment 6B00. Such a cloud-based service environment supports access to workspaces through the execution of workspace access code (e.g., workspace access code $642_0$, workspace access code $642_1$, and workspace access code $642_2$) Workspace access code can be executed on any of the shown access devices 652 (e.g., laptop device $652_4$, workstation device $652_5$, IP phone device $652_3$, tablet device $652_2$, smart phone device $652_1$, etc.). A group of users can form a collaborator group 658, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Also, a portion of the workspace access code can reside in and be executed on any computing platform 651, including in a tiered architecture (e.g., having middleware components in one tier and back-end components in a different tier). As shown, a portion of the workspace access code resides in and can be executed on one or more processing elements (e.g., processing element $605_1$). The workspace access code can interface with storage devices such the shown networked storage 655. Storage of workspaces and/or any constituent files or objects, and/or any other code or scripts or data can be stored in any one or more storage partitions (e.g., storage partition $604_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 657). A stored workspace can be delivered to a particular user and/or shared with other particular users via a download (e.g., a download from a processing element to an access device over a download network path 659).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:

identifying a first server and a second server, the first server comprising an application and one or more in-process code components that run in a first process within the first server, the second server comprising one or more out-of-process code components that run in a second process different from the first process;

executing the application in the first process at the first server, wherein the application accesses at least one content object;

receiving, from the application, at least one request to perform a function on the at least one content object;

accessing a data structure comprising entries that relate the function to at least the one or more in-process code components at a first code location or the one or more out-of-process code components at a second code location;

determining whether to invoke the function as an in-process code component at the first server or an out-of-process code component at the second code location by comparing a first predicted or measured performance of the function on the first server using the first code location to a second predicted or measured performance of the function on the second server using the second code location, wherein determining whether to invoke the function is performed dynamically upon receiving the at least one request;

upon determining to invoke the function as the in-process code component at the first server, generating, at the first server, an in-process response by:
deploying the in-process code component at the first server, and
processing the at least one request with the in-process code component deployed at the first server;
upon determining to invoke the function as the out-of-process code component at the second code location, receiving an out-of-process response from the second server by processing the at least one request at the second server with the one or more out-of-process code components that run in the second process separate from the application; and
building application responses to the at least one request by invoking the function as the in-process code component at the first server or the out-of-process code component at the second code location.

2. The method of claim 1, further comprising retrieving at least one code component from a code component repository.

3. The method of claim 2, further comprising installing the retrieved code component into the first process.

4. The method of claim 2, further comprising installing the retrieved code component into the second process.

5. The method of claim 1, further comprising accessing performance data.

6. The method of claim 5, wherein building the application response is based at least in part on the performance data.

7. The method of claim 1, wherein the data structure is a code component graph.

8. The method of claim 1, further comprising projecting the request over a projection graph to generate constituent operations.

9. The method of claim 8, wherein the constituent operations comprise application programming interface calls having contract attributes.

10. The method of claim 1, further comprising composing the in-process code components at the first server if the in-process code component is not available at the first code location.

11. A computer readable medium, embodied in a non-transitory computer readable medium, the non-transitory computer readable medium having stored thereon a sequence of instructions which, when stored in memory and executed by a processor causes the processor to perform a set of acts, the acts comprising:
identifying a first server and a second server, the first server comprising an application and one or more in-process code components that run in a first process within the first server, the second server comprising one or more out-of-process code components that run in a second process different from the first process;
executing the application in the first process at the first server, wherein the application accesses at least one content object;
receiving, from the application, at least one request to perform a function on the at least one content object;
accessing a data structure comprising entries that relate the function to at least the one or more in-process code components at a first code location or the one or more out-of-process code components at a second code location;
determining whether to invoke the function as an in-process code component at the first server or an out-of-process code component at the second code location by comparing a first predicted or measured performance of the function on the first server using the first code location to a second predicted or measured performance of the function on the second server using the second code location, wherein determining whether to invoke the function is performed dynamically upon receiving the at least one request;
upon determining to invoke the function as the in-process code component at the first server, generating, at the first server, an in-process response by:
deploying the in-process code component at the first server, and
processing the at least one request with the in-process code component deployed at the first server;
upon determining to invoke the function as the out-of-process code component at the second code location, receiving an out-of-process response from the second server by processing the at least one request at the second server with the one or more out-of-process code components that run in the second process separate from the application; and
building application responses to the at least one request by invoking the function as the in-process code component at the first server or the out-of-process code component at the second code location.

12. The computer readable medium of claim 11, further comprising instructions which, when stored in memory and executed by a processor causes the processor to perform retrieving at least one code component from a code component repository.

13. The computer readable medium of claim 12, further comprising instructions which, when stored in memory and executed by a processor causes the processor to perform installing the code component into the first process.

14. The computer readable medium of claim 12, further comprising instructions which, when stored in memory and executed by a processor causes the processor to perform installing the code component into the second process.

15. The computer readable medium of claim 11, further comprising instructions which, when stored in memory and executed by a processor causes the processor to perform accessing performance data.

16. The computer readable medium of claim 15, wherein building the application response is based at least in part on the performance data.

17. The computer readable medium of claim 11, further comprising composing the in-process code components at the first server if the in-process code component is not available at the first code location.

18. The computer readable medium of claim 11, further comprising instructions which, when stored in memory and executed by a processor causes the processor to perform projecting the request over a projection graph to generate constituent operations.

19. A system comprising:
a first server and a second server, the first server comprising an application and one or more in-process code components that run in a first process within the first server, the second server comprising one or more out-of-process code components that run in a second process different from the first process, wherein the first server executes the application in a first process, wherein the application accesses at least one content object, and to receive, from the application, at least one request to perform a function on the at least one content object; and a federator implemented in a server, wherein the server performs,
  accessing a data structure comprising entries that relate the function to at least the one or more in-process code components at a first code location or the one or more out-of-process code components at a second code location;
  determining whether to invoke the function as an in-process code component at the first server or an out-of-process code component at the second code location by comparing a first predicted or measured performance of the function on the first server using the first code location to a second predicted or measured performance of the function on the second server using the second code location, wherein determining whether to invoke the function is performed dynamically upon receiving the at least one request;
  upon determining to invoke the function as the in-process code component at the first server, generating, at the first server, an in-process response by:
    deploying the in-process code component at the first server, and
    processing the at least one request with the in-process code component deployed at the first server;
  upon determining to invoke the function as the out-of-process code component at the second code location, receiving an out-of-process response from the second server by processing the at least one request at the second server with the one or more out-of-process code components that run in the second process separate from the application; and
  building application responses to the at least one request by invoking the function as the in-process code component at the first server or the out-of-process code component at the second code location.

20. The system of claim 19, further comprising a network interface to retrieve at least one code component from a code component repository.

* * * * *